United States Patent
Ohta et al.

(10) Patent No.: US 7,933,099 B2
(45) Date of Patent: Apr. 26, 2011

(54) THIN-FILM MAGNETIC HEAD HAVING ELECTRIC LAPPING GUIDE AND METHOD OF MAKING THE SAME

(75) Inventors: Naoki Ohta, Tokyo (JP); Tetsuya Kuwashima, Tokyo (JP); Kazuki Sato, Tokyo (JP); Kosuke Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 1049 days.

(21) Appl. No.: 11/783,719

(22) Filed: Apr. 11, 2007

(65) Prior Publication Data

US 2008/0253033 A1 Oct. 16, 2008

(51) Int. Cl.
*G11B 5/33* (2006.01)
*G11B 5/39* (2006.01)

(52) U.S. Cl. ........................................................ 360/322

(58) Field of Classification Search .................. 360/319, 360/321, 324, 324.2, 322, 323, 320
See application file for complete search history.

(56) References Cited

U.S. PATENT DOCUMENTS

| | | | | |
|---|---|---|---|---|
| 5,761,009 A | * | 6/1998 | Hughbanks et al. | 360/323 |
| 5,986,856 A | * | 11/1999 | Macken et al. | 360/317 |
| 6,381,107 B1 | * | 4/2002 | Redon et al. | 360/324.2 |
| 6,954,341 B2 | * | 10/2005 | Kamata et al. | 360/322 |
| 2005/0185345 A1 | * | 8/2005 | Ding et al. | 360/319 |
| 2005/0264947 A1 | * | 12/2005 | Nishiyama | 360/319 |
| 2007/0002502 A1 | * | 1/2007 | Burbank et al. | 360/319 |
| 2008/0144229 A1 | * | 6/2008 | Ho et al. | 360/319 |

FOREIGN PATENT DOCUMENTS

| | | |
|---|---|---|
| JP | A-10-133397 | 5/1998 |
| JP | A-11-185218 | 7/1999 |
| JP | A-2003-091804 | 3/2003 |
| JP | A-2006-147074 | 6/2006 |

* cited by examiner

*Primary Examiner* — Craig A. Renner
*Assistant Examiner* — Tamara Ashford
(74) *Attorney, Agent, or Firm* — Oliff & Berridge, PLC

(57) ABSTRACT

A magnetic head having precisely controlled MR height has a slider substrate and a magnetic head part provided on the slider substrate. The magnetic head part includes, seeing from a medium-opposing surface side, a magnetism detecting element; an upper magnetic shield layer arranged on the magnetism detecting element; an electrode layer separated in a track width direction from the upper magnetic shield layer; and a conductor layer, arranged closer to the slider substrate than are the upper magnetic shield layer and electrode layer, extending in the track width direction so as to be in contact with the upper magnetic shield layer and electrode layer and forming a part of the medium-opposing surface.

10 Claims, 24 Drawing Sheets

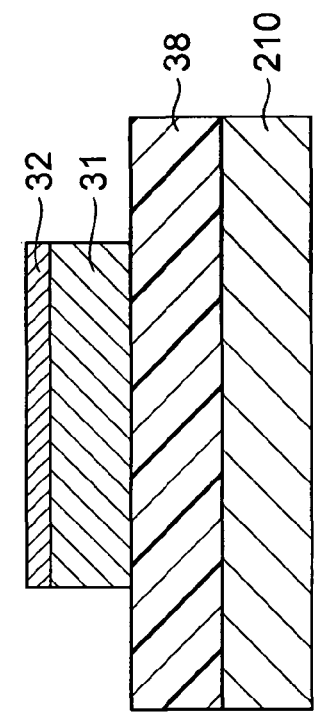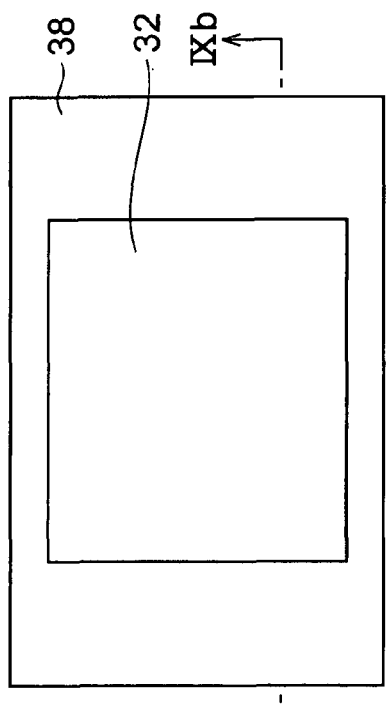
Fig.9

Fig.19
(a)
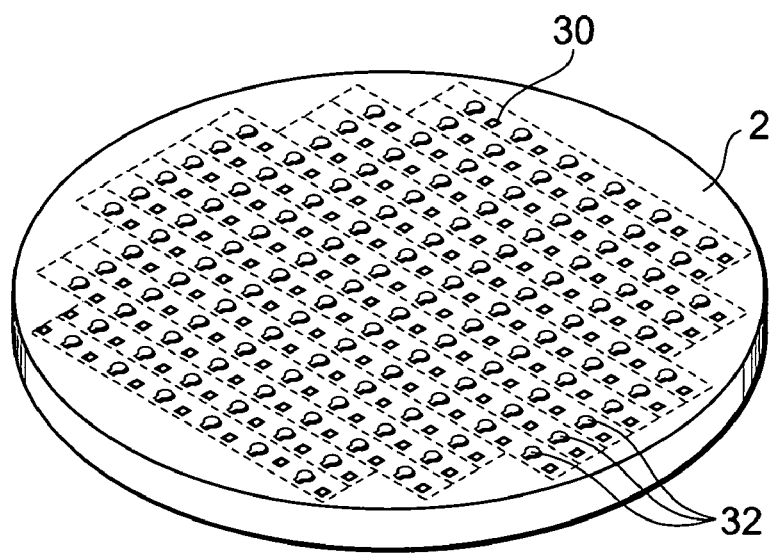
(b)
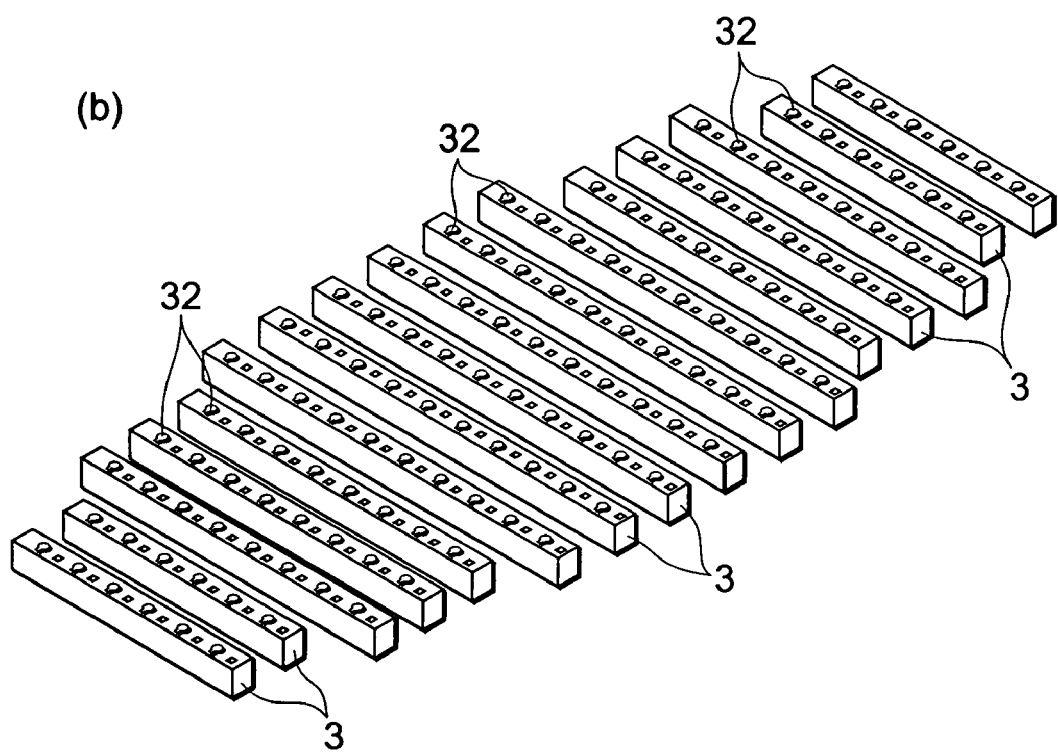

THIN-FILM MAGNETIC HEAD HAVING ELECTRIC LAPPING GUIDE AND METHOD OF MAKING THE SAME

BACKGROUND OF THE INVENTION

1. Field of the Invention

The present invention relates to a magnetic head, a head gimbal assembly, a hard disk drive, and a method of making the magnetic head.

2. Related Background Art

As hard disk drives have been increasing their recording densities, thin-film magnetic heads have been required to further improve their performances. As the thin-film magnetic heads, combined thin-film magnetic heads having a structure in which a magnetism detecting element such as a magnetoresistive (MR) element and a magnetic recording element such as electromagnetic coil element are laminated have been used widely, while these elements detect data signals of a magnetic disk which is a magnetic recording medium and write the data signals to the magnetic disk.

Known as a factor influencing the magnetism detecting performance of a thin-film magnetic head is a condition referred to as MR height which is the height of the magnetoresistive element in a direction perpendicular to its surface opposing the medium. This condition affects the magnitude of reproduced output of the magnetoresistive element, its asymmetry, and the like, and thus is required to be controlled precisely as designed.

The size of MR height is adjusted when cutting a wafer formed with a matrix of thin-film magnetic heads into rows called bars and lapping (polishing) a surface to be formed with the medium-opposing surface of each bar. For detecting the amount of lapping at the time of lapping, each bar is provided with a plurality of electric lapping guides (ELG, also known as resistance lapping guides or RLG).

Specifically, as disclosed in Japanese Patent Application Laid-Open No. 2003-91804, for example, a plurality of electric lapping guides are provided so as to face a surface to be formed with the medium-opposing surface of the bar. As this medium-opposing surface is lapped, the MR height decreases, whereby the electric lapping guides are also polished. This also reduces the height of the electric lapping guides in a direction perpendicular to the medium-opposing surface, whereby the electric resistance value of the electric lapping guides changes according to the amount of polishing. Therefore, measuring changes in the electric resistance value of the electric lapping guides at the time of lapping and terminating the lapping at a predetermined electric resistance value can carry out lapping such as to attain a predetermined MR height.

However, the conventional electric lapping guides are provided at positions distanced from the magnetoresistive element in the longitudinal direction of the bar, while the distance is large as compared with the size of the magnetoresistive element. Therefore, a certain degree of deviation may occur between the size of MR height calculated from the resistance value of the electric lapping guides and the actual size of MR height. In hard disk drives adapted to a high recording density in particular, margins in deviations tolerable in various characteristics of their constituents are so small that the degree of deviation in the size of MR height may become intolerable.

For preventing the above-mentioned deviation in MR height from occurring, a method measuring the resistance value of the magnetoresistive element itself at the time of lapping may be conceived. In a current-perpendicular-to-plane type element in which a sense current flows in a direction perpendicular to its surface of lamination, the distance between the upper and lower electrodes of the element is so short that the electrodes may instantaneously short-circuit under the influence of an abrasive agent or the like at the time of lapping, whereby the resistance value of the element may fluctuate greatly. When a tunneling magnetoresistive element is used as a magnetoresistive element, layers on the upper and lower sides of a barrier layer in the element may short-circuit similarly, whereby the resistance value of the element may further fluctuate. Consequently, the size of MR height has been hard to control precisely while measuring the resistance value of the magnetoresistive element itself at the time of lapping.

Therefore, it is an object of the present invention to provide a magnetic head in which the size of MR height is controlled precisely, a head gimbal assembly and a hard disk drive which are mounted with such a magnetic head, and a method of making a magnetic head in which the size of MR height is controlled precisely.

SUMMARY OF THE INVENTION

The present invention provides a magnetic head comprising a slider substrate and a magnetic head part provided on the slider substrate; wherein the magnetic head part comprises, seeing from a medium-opposing surface side, a magnetism detecting element; an upper magnetic shield layer arranged on the magnetism detecting element; an electrode layer separated in a track width direction from the upper magnetic shield layer; and a conductor layer, arranged closer to the slider substrate than are the upper magnetic shield layer and electrode layer, extending in the track width direction so as to be in contact with the upper magnetic shield layer and electrode layer and forming a part of the medium-opposing surface.

In the present invention, the conductor layer, i.e., the layer to become an electric lapping guide, is in contact with the upper magnetic shield layer arranged on the magnetism detecting element, whereby the conductor layer and the magnetism detecting element are positioned very close to each other. Since the conductor layer and the magnetism detecting element are very close to each other, their forms can easily be defined with a high precision by the same resist pattern. Consequently, the amount of polishing the magnetism detecting element can be grasped accurately if the amount of polishing the conductor layer is measured in the step of lapping the medium-opposing surface. The amount of polishing the conductor layer can be measured by the change in electric resistance value of the conductor layer, whereas this electric resistance value can be measured by using the upper magnetic shield layer and electrode layer in contact with the conductor layer as electrodes. Therefore, using the upper magnetic shield layer, electrode layer, and conductor layer as electric lapping guides in the step of lapping the medium-opposing surface and terminating the lapping when the electric resistance value of the conductor layer reaches a predetermined value can yield a magnetic head whose size of MR height is controlled precisely. Here, the upper magnetic shield layer also functions as an electrode for the electric lapping guides, thereby simplifying the structure of the magnetic head.

Preferably, the height of the conductor layer in a direction perpendicular to the medium-opposing surface is equal to the height of the magnetism detecting element at an end face thereof on the upper magnetic shield layer side in the direction perpendicular to the medium-opposing surface. This simplifies the structure of the magnetic head.

Preferably, the magnetic head part has a pair of electrode layers, the pair of electrode layers being separated from each other in the track width direction while holding the upper magnetic shield layer therebetween, the electrode layers being provided with respective conductor layers.

Consequently, the conductor layers can be provided at two positions independently from each other, whereby lapping the medium-opposing surface while measuring their electric resistance values at the same time makes it possible to control the size of MR height more precisely.

Preferably, the shortest distance between an area of the upper magnetic shield layer in contact with the conductor layer and an area of one electrode layer in contact with the conductor layer is equal to the shortest distance between the area of the upper magnetic shield layer in contact with the conductor layer and an area of the other electrode layer in contact with the conductor layer.

In this case, the medium-opposing surface can easily be lapped flatly if the respective conductor layers at two positions are regulated so as to have the same electric resistance value.

Preferably, the pair of conductor layers construct one layer in contact with the first and second electrode layers. In this case, the conductor layer can also act as a metal gap layer disposed between the upper magnetic shield layer and the magnetism detecting element, thereby simplifying the structure of the magnetic head.

Preferably, a gap layer having a composition different from that of the pair of conductor layers is arranged between the pair of conductor layers and between the magnetism detecting element and the upper magnetic shield layer.

This makes it possible to form the gap layer disposed between the upper magnetic shield layer and magnetism detecting element and the conductor layer from materials different from each other, whereby materials suitable for their respective functions can be selected.

Preferably, the magnetism detecting element is a current-perpendicular-to-plane type element in which a sense current flows in a direction perpendicular to its surface of lamination. This makes it possible to control the size of MR height precisely in a magnetic head having a current-perpendicular-to-plane type magnetism detecting element which is hard to lap while measuring the electric resistance value of the magnetism detecting element itself.

Preferably, the magnetism detecting element is a tunneling magnetoresistive element. This makes it possible to control the size of MR height precisely in a magnetic head having a tunneling magnetoresistive element which is hard to lap while measuring the electric resistance value of the magnetism detecting element itself.

The HGA in accordance with the present invention preferably comprises the above-mentioned magnetic head and a suspension for supporting the magnetic head, whereas the hard disk drive in accordance with the present invention preferably comprises the above-mentioned HGA and a magnetic recording medium opposing the medium-opposing surface. This can yield a hard disk drive whose magnetic head has a precisely controlled MR height, which is adaptable to high-density magnetic recording.

The present invention provides a method of making a magnetic head, the method comprising the steps of forming, on a multilayer body constituted by a substrate laminated thereon with a magnetism detecting element and a conductor layer, a resist pattern extending in a track width direction so as to cover a part of the magnetism detecting element and a part of conductor layer; removing an unmasked part of each of the magnetism detecting element and conductor layer while using the resist pattern as a mask; forming an upper shield layer, in contact with one end of the conductor layer, covering the magnetism detecting element, and an electrode layer in contact with the other end of the conductor layer; and polishing a medium-opposing surface of the multilayer body while using the conductor layer as a sensor.

In the present invention, the resist pattern extending in the track width direction can define the respective heights of the conductor layer, i.e., the layer to become an electric lapping guide, and the magnetism detecting element in a direction perpendicular to the medium-opposing surface at the same time. Since the conductor layer is in contact with the upper magnetic shield layer covering the magnetism detecting element, the conductor layer and the magnetism detecting element are positioned close to each other. This makes it possible to define the relative positional relationship between the conductor layer and the magnetism detecting element precisely. Consequently, the amount of polishing the magnetism detecting element can be grasped accurately if the amount of polishing the conductor layer is measured in the step of lapping the medium-opposing surface. Polishing the conductor layer changes its electric resistance value, which can be measured by using the upper magnetic shield layer and electrode layer in contact with the conductor layer as electrodes. Therefore, using the conductor layer as a sensor (electric lapping guide) at the time of lapping and terminating the lapping when the electric resistance value reaches a predetermined value can yield a magnetic head whose size of MR height is precisely controlled to a predetermined value. Here, the upper magnetic shield layer also functions as an electrode for the electric lapping guide, whereby the making of the magnetic head becomes easier.

Preferably, the resist pattern has the same height in the direction perpendicular to the medium-opposing surface on the magnetism detecting element and on the conductor layer. This further simplifies the structure of the magnetic head and facilitates the making thereof.

The present invention provides a magnetic head in which the size of MR height is controlled precisely, a head gimbal assembly and a hard disk drive which are mounted with such a magnetic head, and a method of making a magnetic head in which the size of MR height is controlled precisely.

BRIEF DESCRIPTION OF THE DRAWINGS

FIG. 9 is a process drawing for explaining a part of the method of making the magnetic head 21 in accordance with a first embodiment;

FIG. 19(a) is a view showing a state where a plurality of magnetic heads 21 are formed on a wafer 2, whereas FIG. 19(b) is a view showing a state where a plurality of bars 3 each arranged with a row of magnetic heads 21 are made by cutting a support;

DESCRIPTION OF THE PREFERRED EMBODIMENTS

Figure 1:
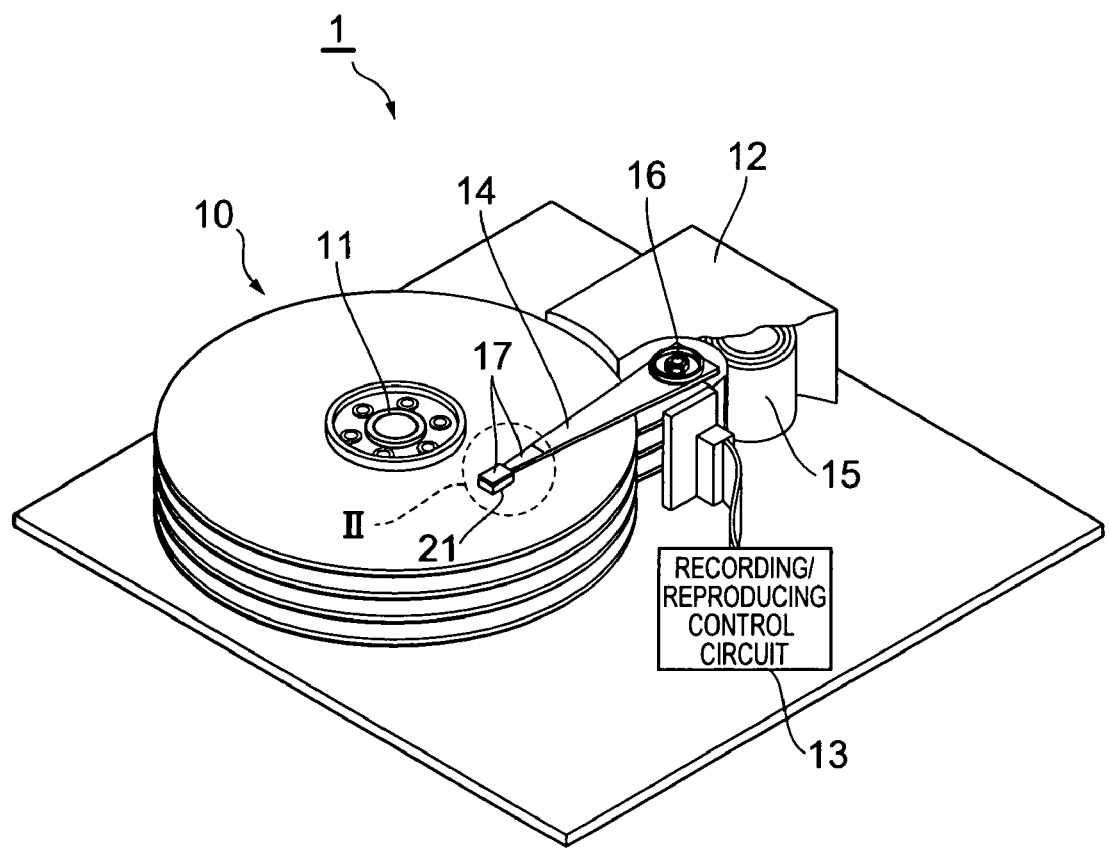
FIG. 1 is a perspective view of the hard disk drive in accordance with an embodiment of the present invention.

In the following, modes for carrying out the present invention will be explained in detail with reference to the accompanying drawings. In the drawings, the same constituents are referred to with the same reference numerals. Ratios of sizes within and among constituents in the drawings are arbitrary for easier viewing of the drawings.

First Embodiment

To begin with, a first embodiment of the magnetic head, head gimbal assembly, and hard disk drive in accordance with the present invention will be explained.
Hard Disk Drive FIG. 1 is a perspective view of the hard disk drive in accordance with an embodiment.

The hard disk drive 1 comprises a plurality of magnetic disks (magnetic recording media) 10 which are magnetic recording media rotating about a rotary shaft of a spindle motor 11, an assembly carriage device 12 for positioning magnetic heads 21 onto tracks, and a recording and reproducing control circuit 13 for controlling writing and reading operations of the magnetic heads 21.

Figure 2:
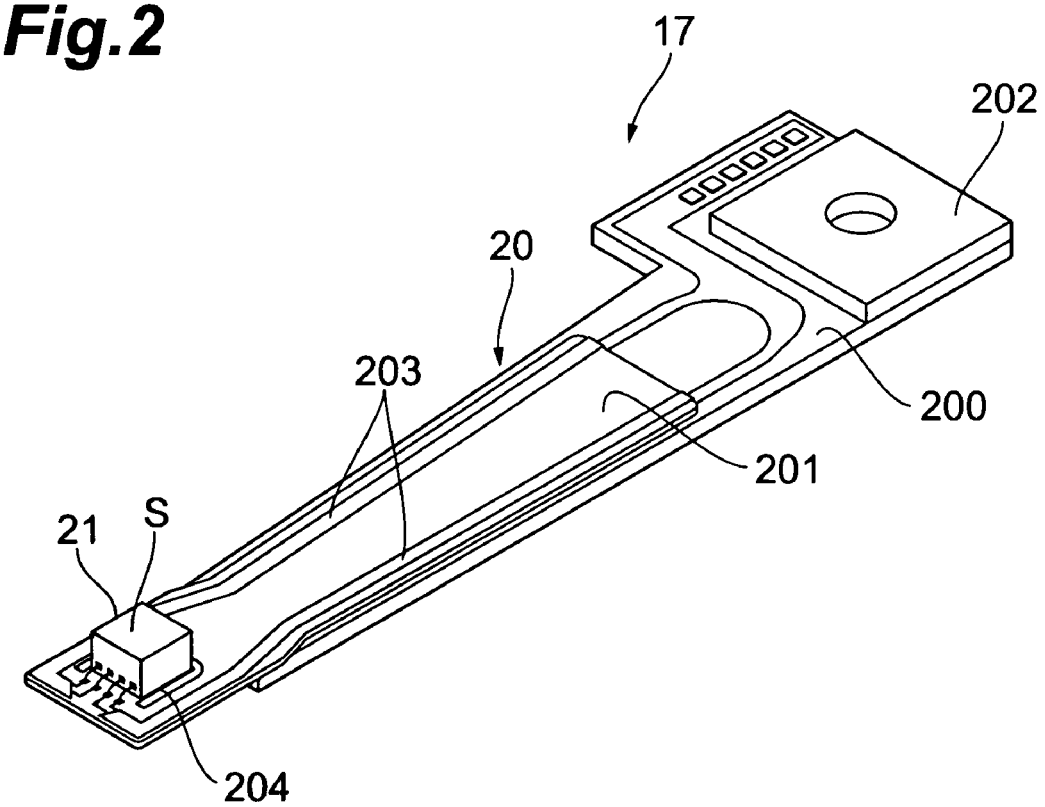
FIG. 2 is a perspective view of an HGA 17.

The assembly carriage device 12 is provided with a plurality of driving arms 14. The driving arms 14 can be swung about a pivot bearing shaft 16 by a voice coil motor (VCM) and are stacked in the direction along the shaft 16. A head gimbal assembly (HGA) 17 is attached to the leading end part of each driving arm 14. Each HGA 17 is provided with a magnetic head 21 which opposes the front face of its corresponding magnetic disk 10. The surface of the magnetic head 21 opposing the front face of the magnetic disk 10 is its medium-opposing surface S (also known as air bearing surface). The magnetic disk 10, driving arm 14, HGA 17, and magnetic head 21 may be provided singly as well.
HGA FIG. 2 is a perspective view of the HGA 17. This drawing shows the HGA 17 with its medium-opposing surface S facing up.

The HGA 17 is constructed by firmly attaching the magnetic head 21 to the leading end part of a suspension 20 and electrically connecting one end of a wiring member 203 to a terminal electrode of the magnetic head 21. The suspension 20 is mainly constituted by a load beam 200, a flexure 201 which is firmly attached onto and supported by the load beam 200 and has elasticity, a tongue 204 formed like a leaf spring at the leading end of the flexure 201, a base plate 202 provided at a base part of the load beam 200, and the wiring member 203 provided on the flexure 201 and made of a lead conductor and connecting pads electrically connected to both ends thereof.

Figure 3:
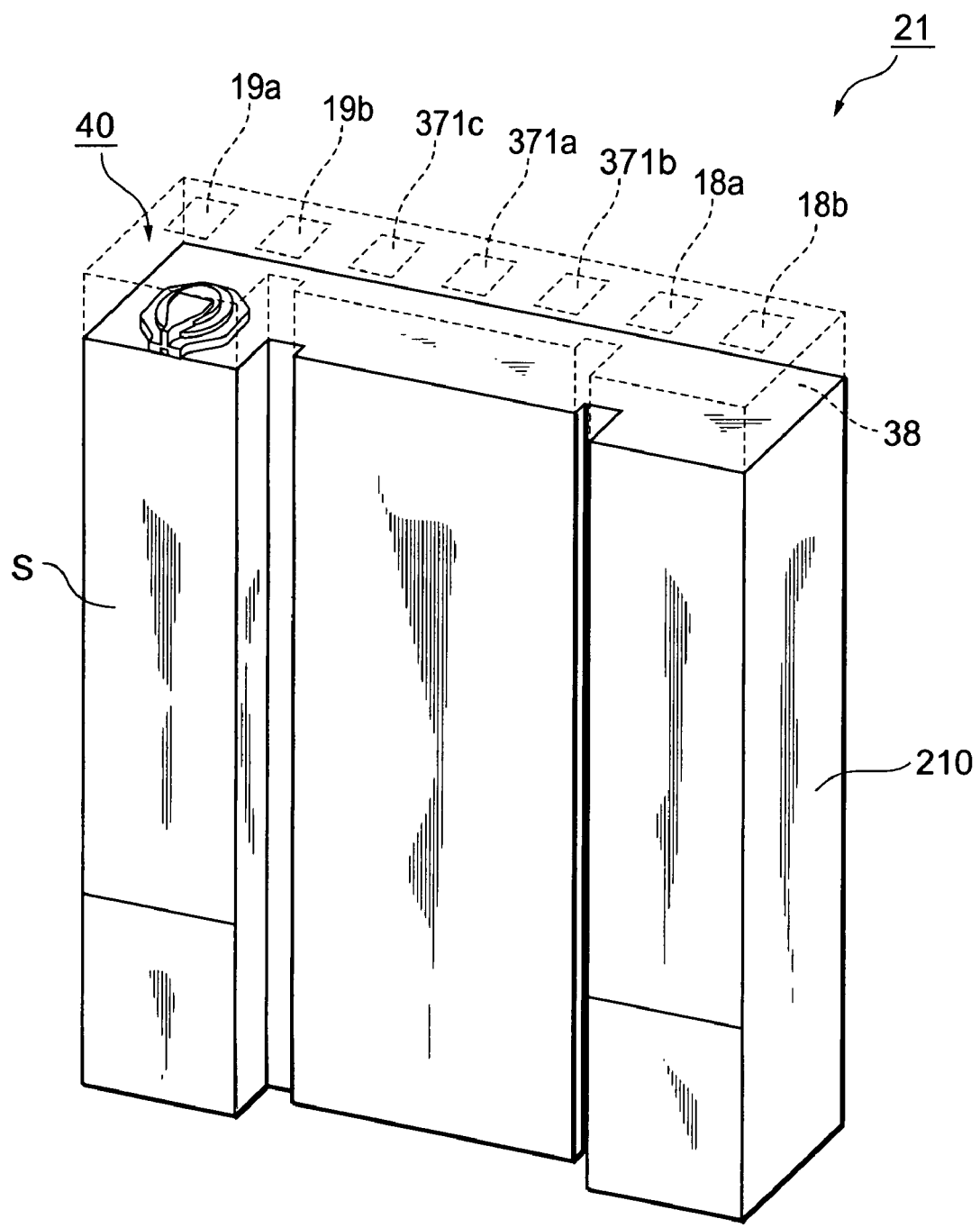
FIG. 3 is an enlarged perspective view of a magnetic head 21 and its surroundings shown in FIG. 1.

It is clear that the structure of the suspension is not limited to that mentioned above. A head driving IC chip, which is not depicted, may be mounted somewhere in the suspension 20.
Magnetic Head FIG. 3 is an enlarged perspective view of the magnetic head 21. The magnetic head 21 has a substantially rectangular parallelepiped form with a magnetic head part 40 formed on a side face of a slider substrate 210 mainly composed of AlTiC ($Al_2O_3 \cdot TiC$). The surface on the front side of this drawing is the medium-opposing surface S opposing the recording surface of the hard disk 10. When the hard disk 10 rotates, an airflow caused by the rotation levitates the magnetic head 21, whereby the medium-opposing surface S moves away from the recording surface of the hard disk 10. The magnetic head 21 is provided with an insulating layer 38 as an overcoat layer indicated by broken lines in the drawing. Recording pads 18a, 18b, reproducing pads 19a, 19b, and electric lapping guide pads 371a, 371b, 371c, which will be explained later, are attached onto the insulating layer 38, whereas wires for inputting and outputting electric signals (not depicted) connected to the recording pads 18a, 18b and reproducing pads 19a, 19b are attached to the driving arm 14 shown in FIG. 1. The medium-opposing surface S may be coated with DLC (Diamond Like Carbon) or the like.

Figure 4:
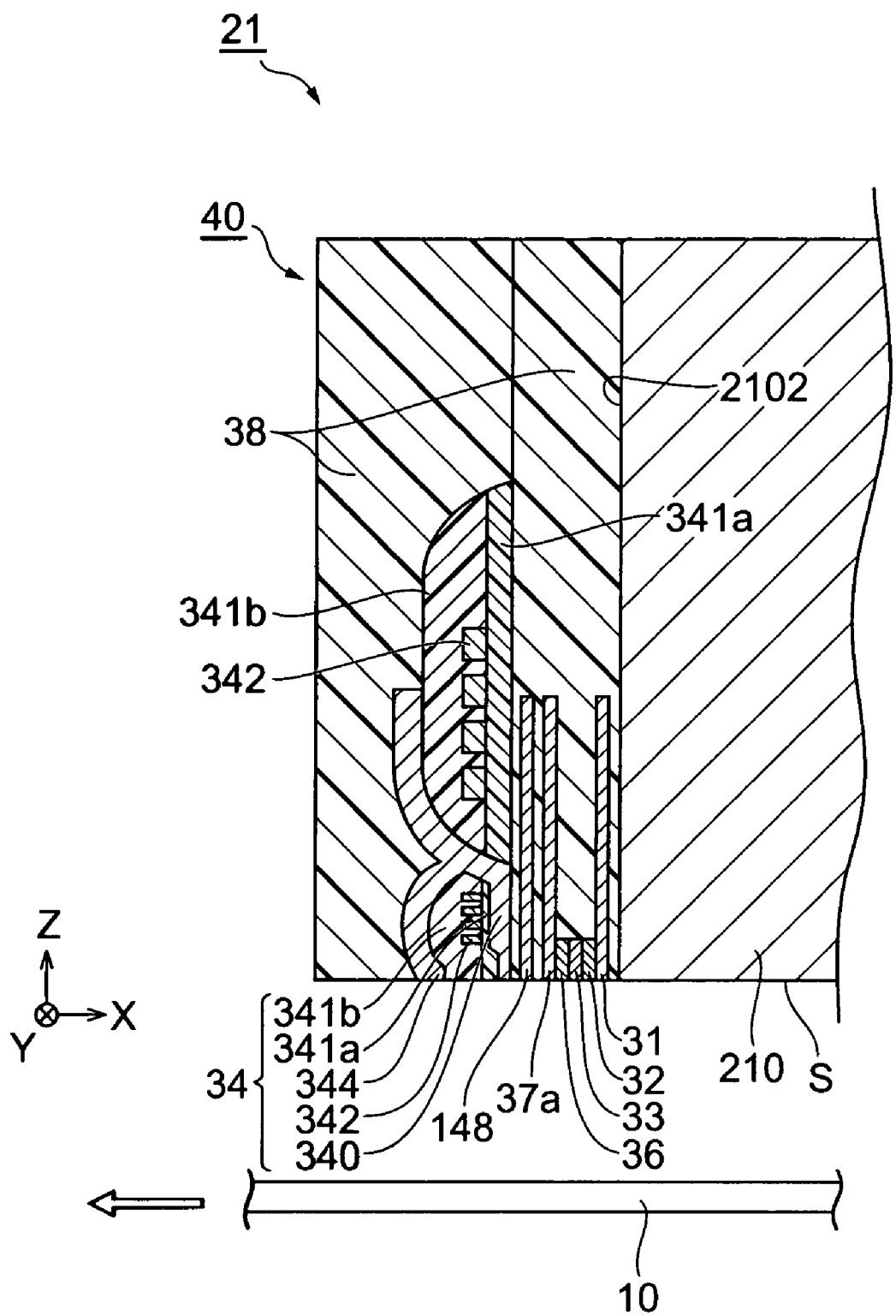
FIG. 4 is a sectional view of the magnetic head 21 taken along a direction perpendicular to the medium-opposing surface S thereof.
Figure 5:
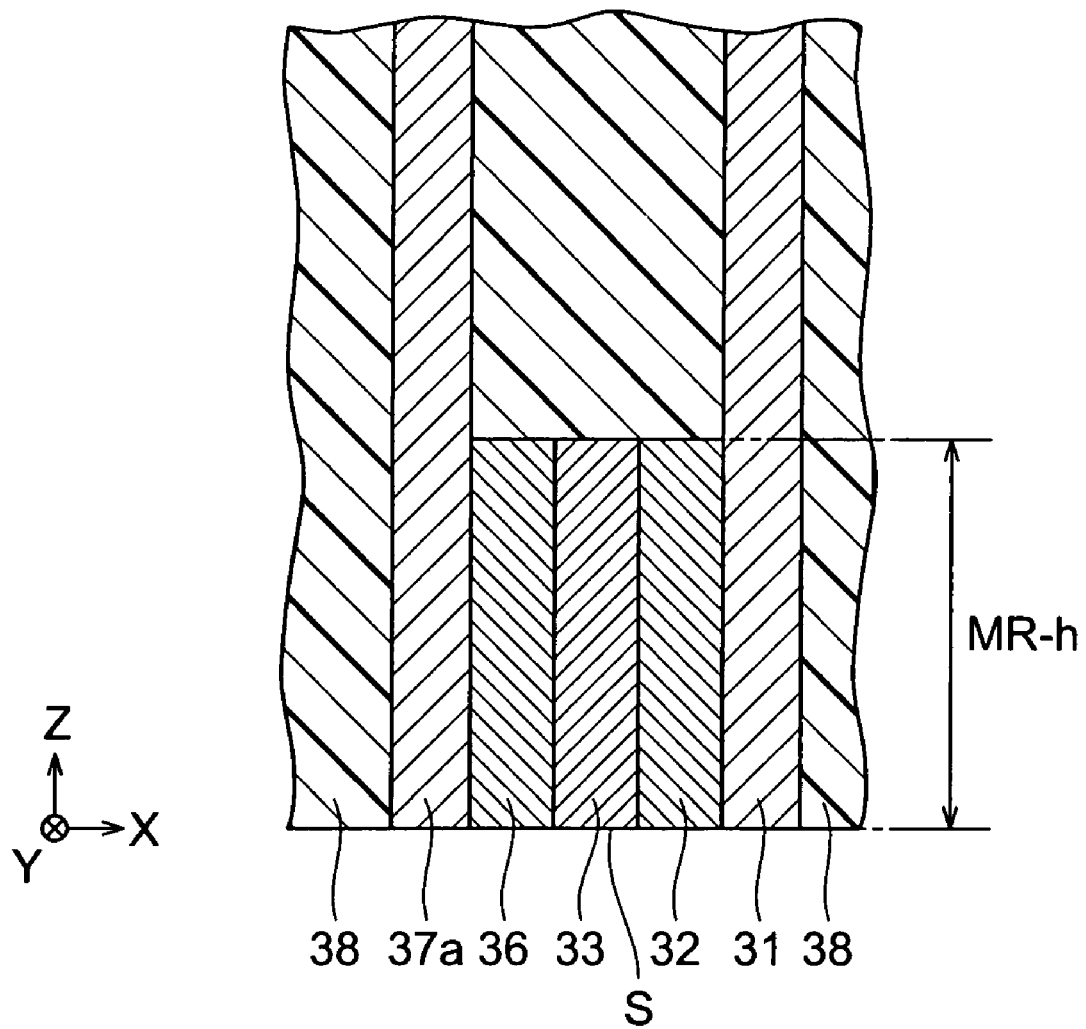
FIG. 5 is a partly enlarged view of the cross section of FIG. 4.

FIG. 4 is sectional view of the magnetic head 21 shown in FIG. 3 as taken along a direction perpendicular to the medium-opposing surface S, whereas FIG. 5 is a partly enlarged view of FIG. 4.

The magnetic head 21 comprises the slider substrate 210 and a magnetic head part 40 provided on a side face 2102 of the medium-opposing surface S in the slider substrate 210.

The magnetic head part 40 has an MR (magnetoresistive) element 33 as a magnetism detecting element arranged between a lower shield layer 31 (lower magnetic shield layer)

and an upper shield layer 37a (upper magnetic shield layer), and an electromagnetic coil element 34 as a magnetic recording element.

The lower shield layer 31 and upper shield layer 37a are flat layers formed so as to be substantially parallel to the side face 2102 of the slider substrate 210, while the lower shield layer 31 is closer to the slider substrate 210 than is the upper shield layer 37a. The lower shield layer 31 and upper shield layer 37a form a part of the medium-opposing surface S. The MR element 33 is arranged such as to be held between the lower shield layer 31 and upper shield layer 37a, and forms a part of the medium-opposing surface S.

Each of the lower shield layer 31 and upper shield layer 37a can be constructed by a magnetic material such as NiFe, CoFeNi, CoFe, FeN, or FeZrN having a thickness on the order of 0.5 to 3 µm formed by pattern plating including frame plating, for example. The upper and lower shield layers 31 and 37a prevent the MR element 33 from being influenced by external magnetic fields which become noises.

In this embodiment, the MR element 33 is a current-perpendicular-to-plane (CPP) type element in which a sense current flows in a direction perpendicular to its surface of lamination, for which a tunneling magnetoresistive (TMR) element or CPP-GMR (Giant MagnetoResistive) element can be used favorably. Using such a magnetoresistive element as the MR element 33 makes it possible to receive signal magnetic fields with a very high sensitivity from magnetic disks.

A TMR element employed as the MR element 33 has a structure in which an antiferromagnetic layer made of IrMn, PtMn, NiMn, RuRhMn, or the like having a thickness on the order of 5 to 15 nm; a magnetization fixed layer constituted, for example, by CoFe or the like, which is a ferromagnetic material, two layers of CoFe holding a nonmagnetic metal layer such as Ru, or the like, while its direction of magnetization is fixed by the antiferromagnetic layer; a tunnel barrier layer made of a nonmagnetic dielectric material which is formed when a metal film made of Al, AlCu, Mg, or the like having a thickness on the order of 0.5 to 1 nm is oxidized naturally or with oxygen introduced into a vacuum apparatus, for example; and a free magnetization layer which is constituted by a two-layer film made of CoFe or the like having a thickness of about 1 nm and NiFe or the like having a thickness on the order of 3 to 4 nm which are ferromagnetic materials, for example, while forming a tunneling junction with the magnetization fixed layer through the tunnel barrier layer are successively laminated. A CPP-GMR element employed as the MR element 33 has a structure replacing the tunnel barrier layer in the above-mentioned TMR element with a nonmagnetic conductive layer made of Cu or the like having a thickness on the order of 1 to 3 nm.

As shown in FIG. 5, a lower metal gap layer 32 is provided between the lower shield layer 31 and MR element 33, whereas an upper metal gap layer (conductor layer) 36 is provided between the MR element 33 and upper shield layer 37a. The height of the lower metal gap layer 32 and upper metal gap layer 36 in the direction perpendicular to the medium-opposing surface S (in the direction along the Z axis in FIG. 5) is the same as MR height (MR-h) which is the height of the MR element 33 in the direction perpendicular to the medium-opposing surface S.

The upper and lower metal gap layers 32 and 36 are constituted by a nonmagnetic material and function to prevent a magnetic domain control layer 35 (see FIG. 6) which will be explained later and the upper and lower shield layers 37a, 31 from being magnetically coupled to each other. The upper and lower metal gap layers 32 and 36 are constituted by a conductive material. This electrically connects the lower shield layer 31 and MR element 33 to each other and the MR element 33 and upper shield layer 37a to each other, whereby the upper and lower shield layers 37a, 31 also function as upper and lower electrode layers for supplying a sense current to the MR element 33, respectively. For example, Ru or Ta can be used as the upper and lower metal gap layers 32 and 36.

As shown in FIG. 4, an interelement shield layer 148 made of the same material as that of the upper shield layer 37a is formed between the upper shield layer 37a and electromagnetic coil element 34. The interelement shield layer 148 acts to shield the MR element 33 from magnetic fields generated by the electromagnetic coil element 34, thereby preventing external noises from occurring at the time of readout. A backing coil part may further be formed between the interelement shield layer 148 and electromagnetic coil element 34. The backing coil part generates a magnetic flux for canceling out a magnetic flux loop which is generated by the electromagnetic coil element 34 so as to travel the upper and lower electrode layers of the MR element 33, and suppressing the phenomenon of wide adjacent track erasure (WATE) which is an unnecessary writing or erasing operation to magnetic disks.

An insulating layer 38 made of alumina or the like is formed between the upper and lower shield layers 37a, 31 on the side of the MR element 33 opposite from the medium-opposing surface S, on the upper and lower shield layers 37a, 31, on the side of the interelement shield layer 148 opposite from the medium-opposing surface S, between the lower shield layer 31 and slider substrate 210, and between the interelement shield layer 148 and electromagnetic coil element 34.

The electromagnetic coil element 34 is preferably one for perpendicular magnetic recording, and comprises a main magnetic pole layer 340, a gap layer 341a, a coil insulating layer 341b, a coil layer 342, and an auxiliary magnetic pole layer 344 as shown in FIG. 4.

The main magnetic pole layer 340 is a magnetic path for guiding a magnetic flux induced by the coil layer 342 to the recording layer of a magnetic disk (medium) to be written while converging the same. Here, it will be preferred if the width in the track width direction (direction along the Y axis in FIG. 4) and thickness in the laminating direction (direction along the X axis in FIG. 4) of the main magnetic pole layer 340 are smaller in the end part on the medium-opposing surface S side than in the other parts. This can generate a fine and strong writing magnetic field adapted to higher recording densities.

The end part on the medium-opposing surface S side of the auxiliary magnetic pole layer 344 magnetically coupled to the main magnetic pole layer 340 forms a trailing shield part having a layer cross section wider than that in the other parts of the auxiliary magnetic pole layer 340. The auxiliary magnetic pole layer 344 faces the end part on the medium-opposing surface S side of the main magnetic pole layer 340 through the gap layer 341a and coil insulating layer 341b formed by an insulating material such as alumina. When such an auxiliary magnetic pole layer 344 is provided, the magnetic field gradient becomes steeper between the auxiliary magnetic pole layer 344 and main magnetic pole layer 340 in the vicinity of the medium-opposing surface S. As a result, the jitter in signal output becomes smaller, whereby the error rate at the time of readout can be lowered.

For example, the auxiliary magnetic pole layer 344 is constituted by an alloy composed of two or three of Ni, Fe, and Co, an alloy mainly composed of them and doped with a predetermined element, or the like, formed by frame plating, sputtering, or the like while having a thickness of about 0.5 to about 5 μm.

The gap layer 341a separates the coil layer 342 and main magnetic pole layer 340 from each other, and is constituted by $Al_2O_3$, DLC, or the like formed by sputtering, CVD, or the like, while having a thickness of about 0.01 to about 0.5 μm, for example.

For example, the coil layer 342 is constituted by Cu or the like formed by frame plating or the like while having a thickness of about 0.5 to about 3 μm. The rear end of the main magnetic pole layer 340 and a part of the auxiliary magnetic pole layer 344 remote from the medium-opposing surface S are coupled to each other, while the coil layer 342 is formed so as to surround this coupled part.

The coil insulating layer 341b separates the coil layer 342 and the auxiliary magnetic pole layer 344 from each other, and is constituted by an electrically insulating material such as thermally cured alumina or resist layer having a thickness of about 0.1 to about 5 μm, for example.

On the side of the electromagnetic coil element 34 opposite from the slider substrate 210, the insulating layer 38 as an overcoat layer is formed so as to cover the electromagnetic coil element 34.

Figure 6:
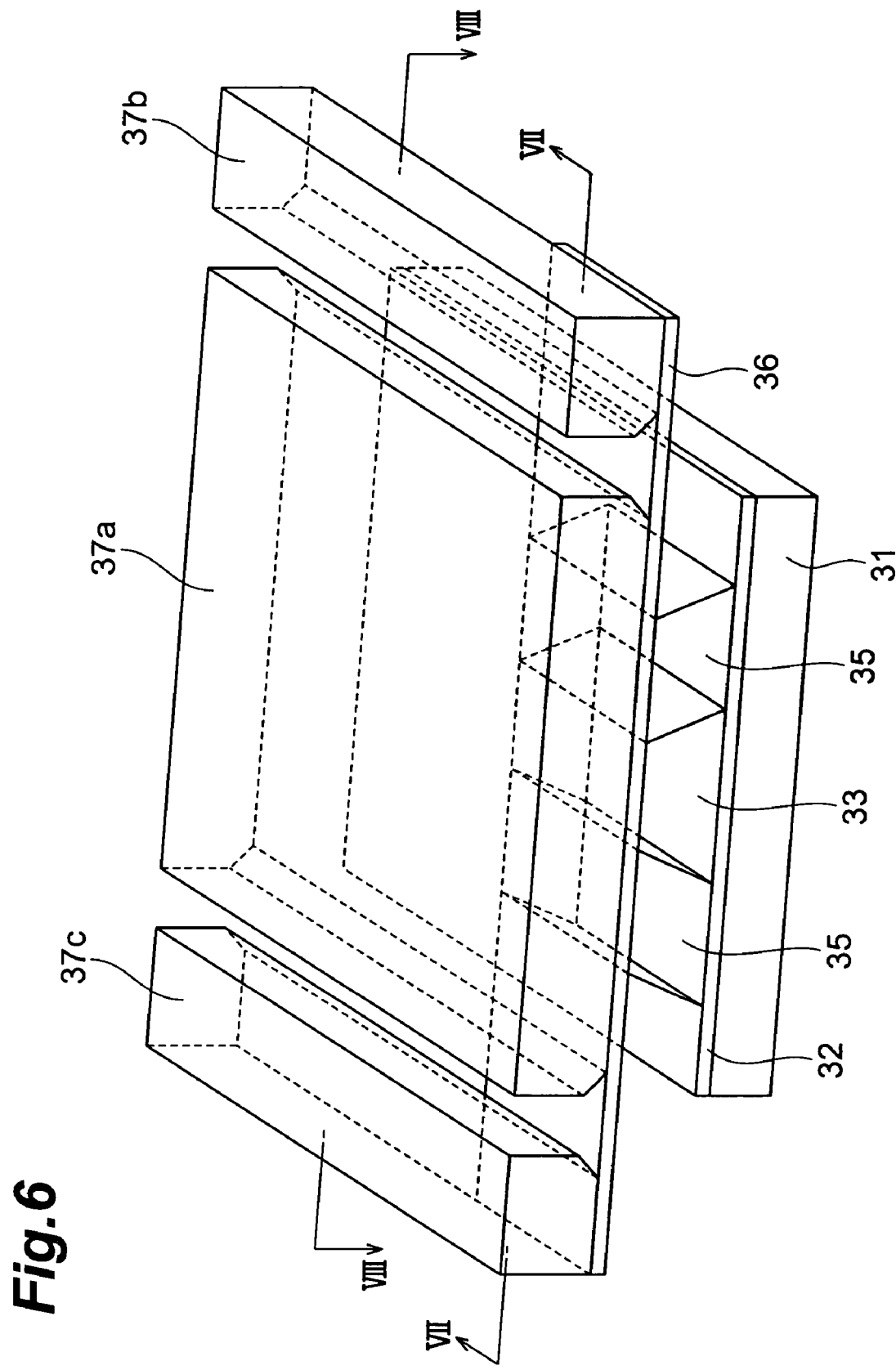
FIG. 6 is a perspective view of the MR element 33 and its surroundings in the magnetic head 21 as seen from the medium-opposing surface S side.
Figure 7:
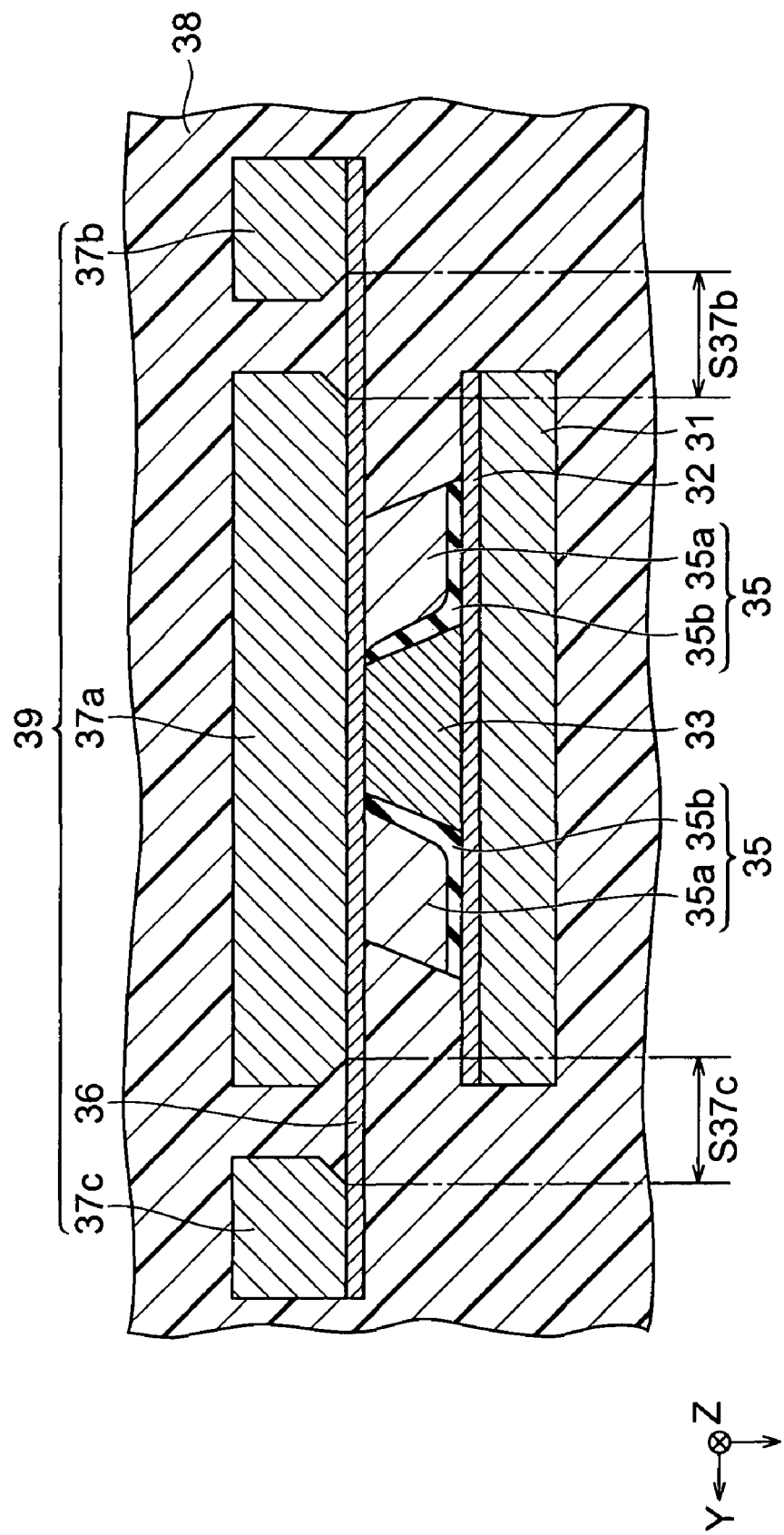
FIG. 7 is a sectional view taken along the line VII-VII of the perspective view in FIG. 6.
Figure 8:
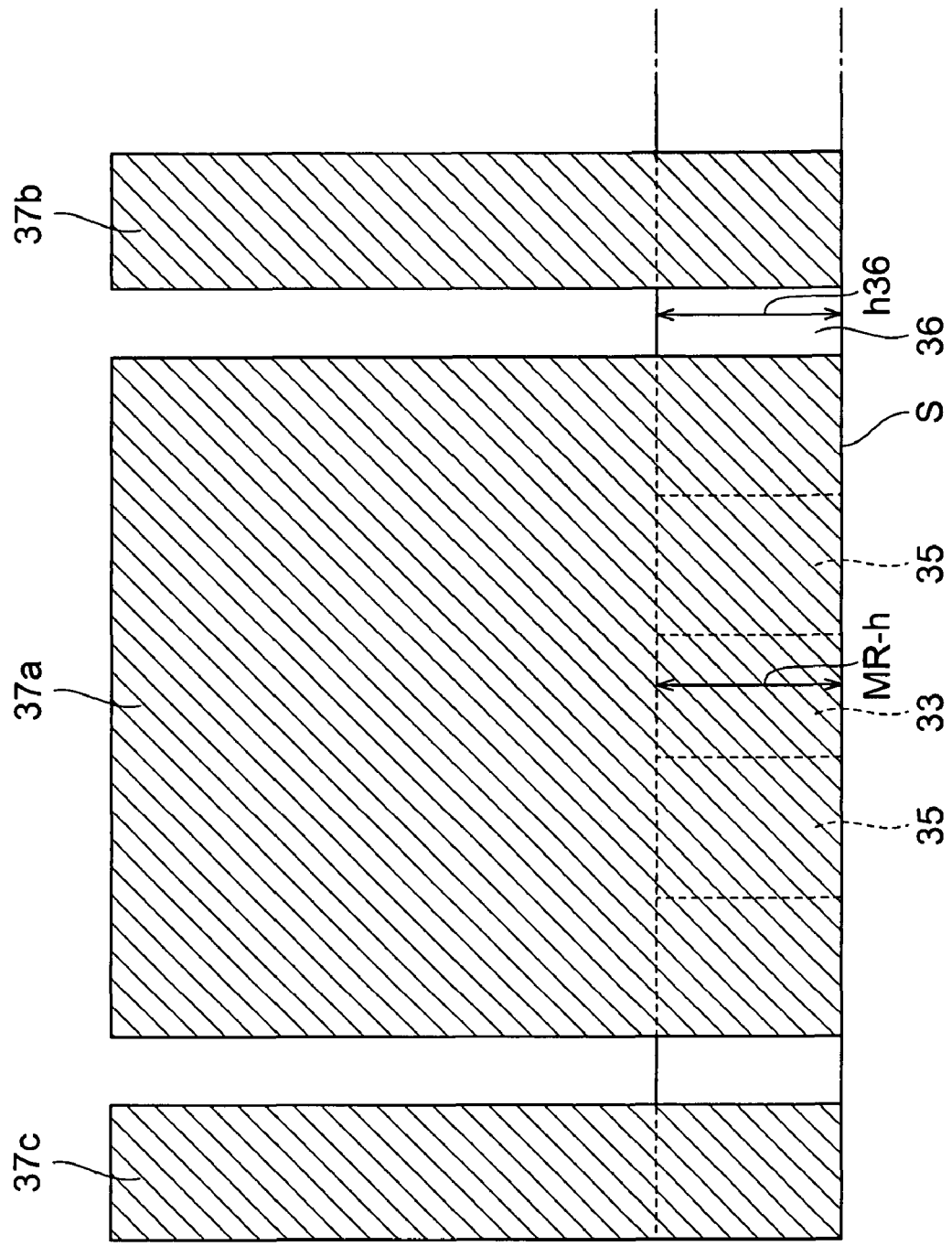
FIG. 8 is a sectional view taken along the line VIII-VIII of the perspective view in FIG. 6.

FIG. 6 is a perspective view of the MR element 33 and its surroundings in the magnetic head 21 as seen from the medium-opposing surface S side. FIG. 7 is a sectional view taken along the line VII-VII of the perspective view in FIG. 6. FIG. 8 is a sectional view taken along the line VIII-VIII of the perspective view in FIG. 6. FIG. 6 does not depict the insulating layer 38.

On both side faces of the MR element 33 in the track width direction (direction along the Y axis in FIGS. 7 and 8), magnetic domain control layers 35 are formed for turning the free magnetization layer of the MR element 33 into a single magnetic domain by applying a bias magnetic field to the MR element 33. Each of the magnetic domain control layers 35 is constituted by a bias magnetic field layer 35a made of a ferromagnetic material such as CoTa, CoCrPt, or CoPt and an insulating separation layer 35b made of an insulating material such as $Al_2O_3$. The insulating separation layer 35b is provided for electrically separating the bias magnetic field layer 35a from the MR element 33 and lower metal gap layer 32. Consequently, a sense current of the MR element 33 which is caused to flow from the upper shield layer 37a (upper electrode layer) to the lower shield layer 31 (lower electrode layer) is prevented from traveling the bias magnetic field layer 35a and thus intensively flows through the MR element 33.

Electrode layers 37b, 37c are provided as a pair of electrode layers on both sides in the track width direction of the upper shield layer 37a and form a part of the medium-opposing surface S. The material constituting the electrode layers 37b, 37c is a conductive metal such as NiFe or Cu, for example, which may be the same as or different from the material constituting the upper shield layer 37a.

As shown in FIGS. 6 and 7, the upper metal gap layer 36 is one layer extending in the track width direction, and forms a part of the medium-opposing surface S. The upper metal gap layer 36 is in contact with the upper shield layer 37a and electrode layers 37b, 37c by the surface on the side opposite from the slider substrate 210 (the surface on the upper side of FIG. 7), and in contact with the MR element 33 and the bias magnetic field layers 35a and insulating separation layers 35b of the magnetic domain control layers 35 by the surface on the slider substrate 210 side (the surface on the lower side of FIG. 7). As shown in FIG. 8, the height h36 of the upper metal gap layer 36 in the direction perpendicular to the medium-opposing surface S (direction along the Z axis in FIG. 8) is constant in any part in the track width direction of the upper metal gap layer 36, and is the same as the MR height (MR-h). As shown in FIG. 7, the shortest distance S37b between the area of the upper shield layer 37a in contact with the upper metal gap layer 36 and the area of the electrode layer 37b in contact with the upper metal gap layer 36 is equal to the shortest distance S37c between the area of the upper shield layer 37a in contact with the upper metal gap layer 36 and the area of the electrode layer 37c in contact with the upper metal gap layer 36. Such an upper metal gap layer 36 becomes a conductor layer.

According to the structures mentioned above, the upper shield layer 37a, the pair of electrode layers 37b, 37c, and the upper metal gap layer 36 become an electric lapping guide 39. This electric lapping guide 39 has a function as a sensor for the amount of lapping the medium-opposing surface in the process of making the magnetic head 21 as will be explained later.

Making Method

The method of making a magnetic head in accordance with the first embodiment will now be explained with reference to FIGS. 9 to 21. Not only sputtering but chemical vapor deposition (CVD) and the like can also be used for forming each layer. Chemical etching (wet etching) as well as dry etching such as IBE (ion beam etching), RIE (reactive ion etching), and sputtering using rare gases can be used for etching.

In each of FIGS. 9 to 18, (a) is a plan view of a magnetic head intermediate, whereas (b) is a sectional view of the plan view of (a).

First, as shown in FIG. 9, an insulating layer 38 is formed on the whole upper face of a slider substrate 210 acting as a substrate. Then, a patterned multilayer body composed of a lower shield layer 31 and a lower metal gap layer 32 is formed on the insulating layer 38.

Figure 10:
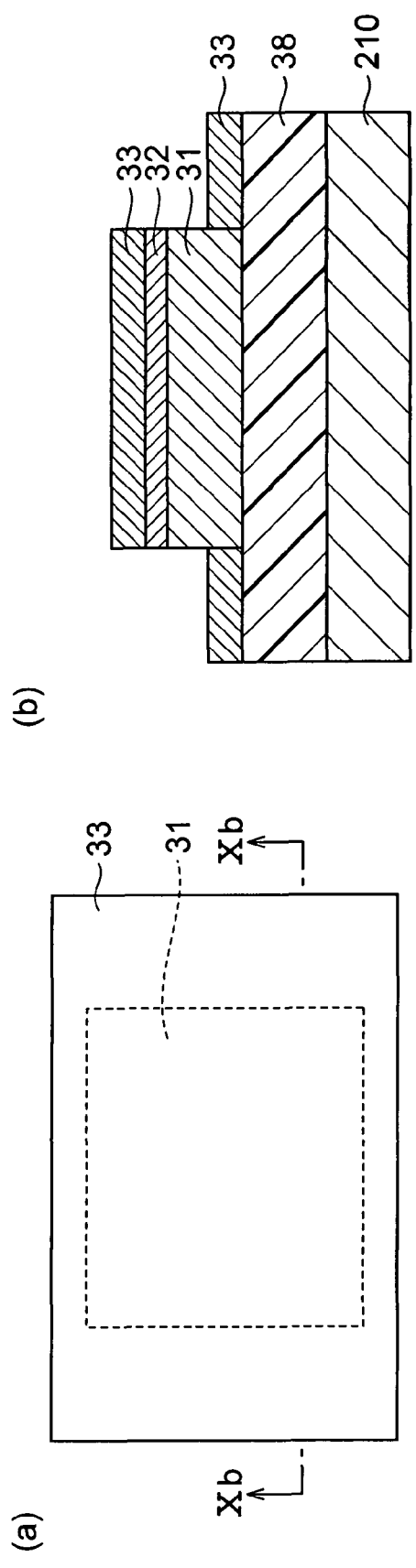
FIG. 10 is a process drawing for explaining a part of the method of making the magnetic head 21 in accordance with the first embodiment.

Subsequently, as shown in FIG. 10, a multilayer film to become the MR element 33, e.g., a multilayer film to become a tunneling magnetoresistive element, is deposited on the whole substrate.

Figure 11:
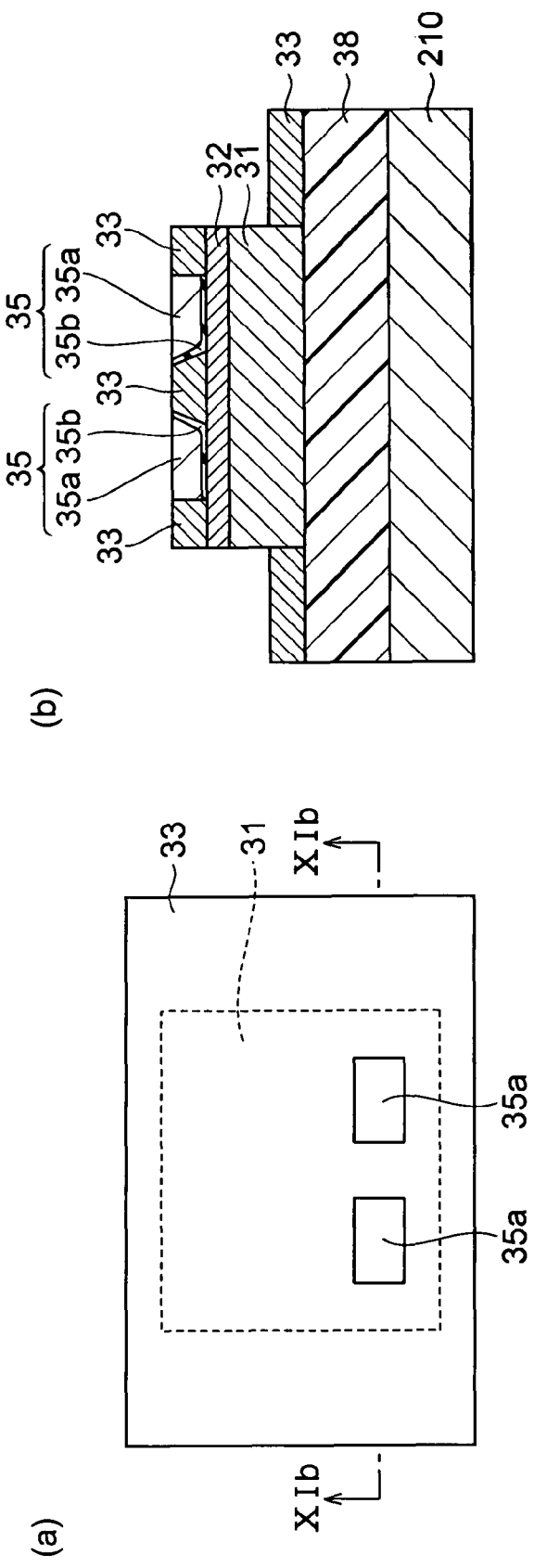
FIG. 11 is a process drawing for explaining a part of the method of making the magnetic head 21 in accordance with the first embodiment.

Next, as shown in FIG. 11, a magnetic domain control layer 35 constituted by an insulating separation layer 35b and a bias magnetic field layer 35a is formed in each of two areas, which are slightly greater than areas to be formed with the magnetic domain control layers 35, by a thickness substantially the same as that of the MR element 33 in their surroundings.

Figure 12:
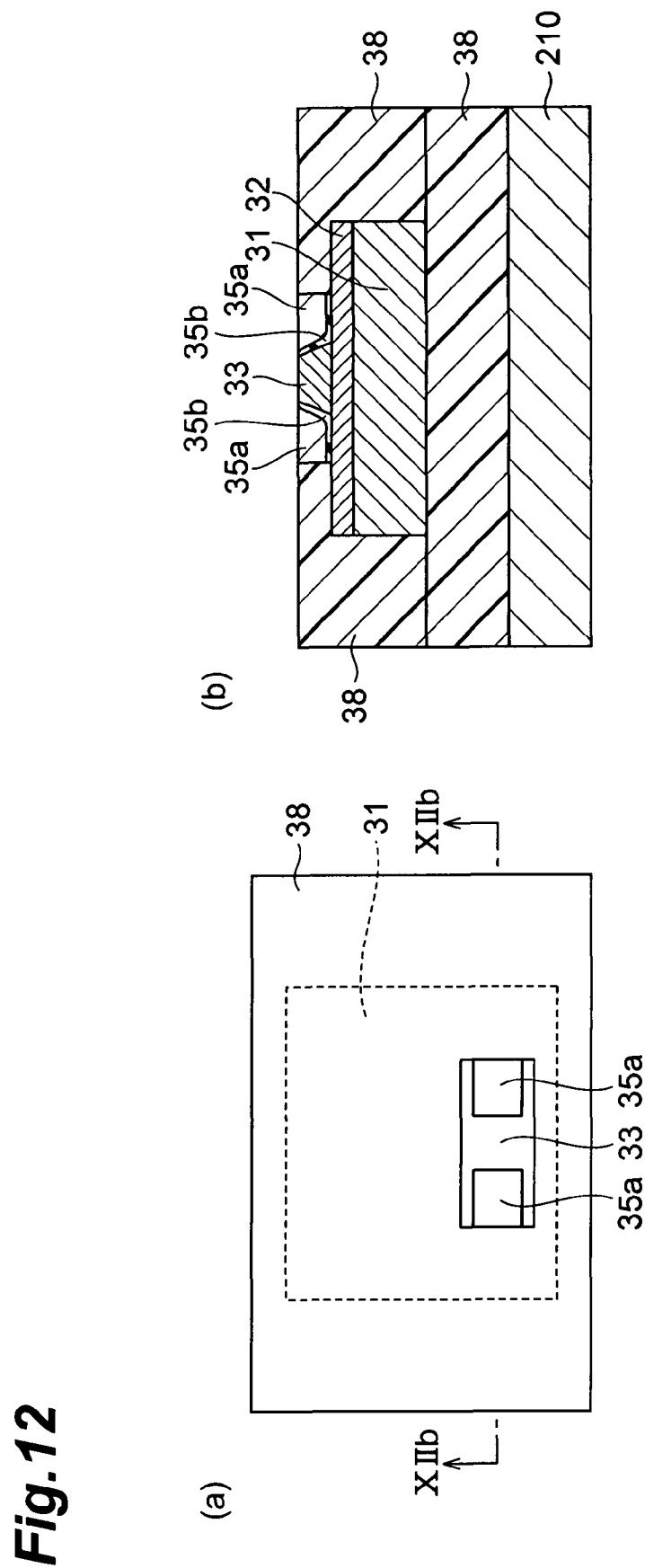
FIG. 12 is a process drawing for explaining a part of the method of making the magnetic head 21 in accordance with the first embodiment.

Subsequently, as shown in FIG. 12, the whole surface of the substrate is coated with a photoresist, a resist pattern is formed only in the upper part in a portion of the magnetic domain control layers 35 and in a portion of the MR element 33, and the MR element 33 and magnetic domain control layers 35 are etched in unmasked areas while using the resist pattern as a mask. After removing the photoresist with a solvent, an insulating layer is deposited by a sufficient thickness and then is chemically mechanically polished until the MR element 33 and magnetic domain control layers 35 are exposed, so that the surface is flattened. Specifically, the height of the remaining resist pattern in the direction perpendicular to the medium-opposing surface (vertical direction in FIG. 12(a)) is made slightly greater than that of the magnetic domain control layers 35, while its length in the track width direction (lateral direction in FIG. 12(b)) is made identical to the length from one end face to the other end face in the track width direction of the two final magnetic domain control layers 35.

Figure 13:
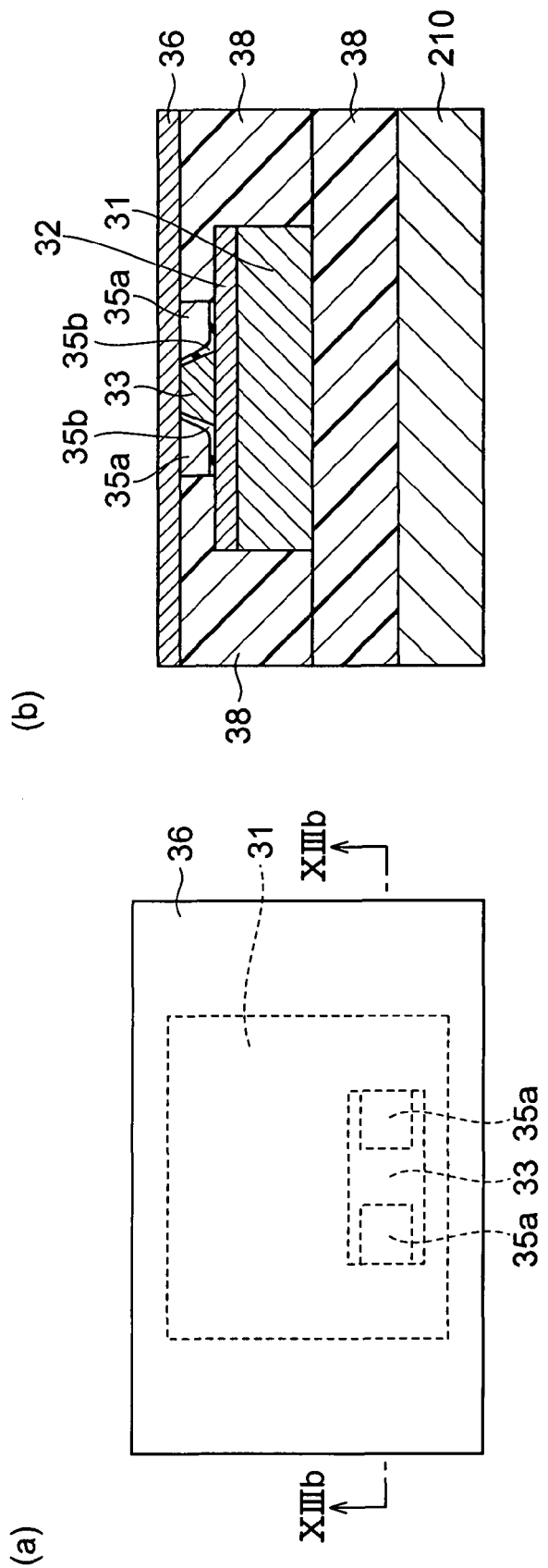
FIG. 13 is a process drawing for explaining a part of the method of making the magnetic head 21 in accordance with the first embodiment.

Next, as shown in FIG. 13, a metal gap layer 36 is deposited on the whole surface of the substrate.

Figure 14:
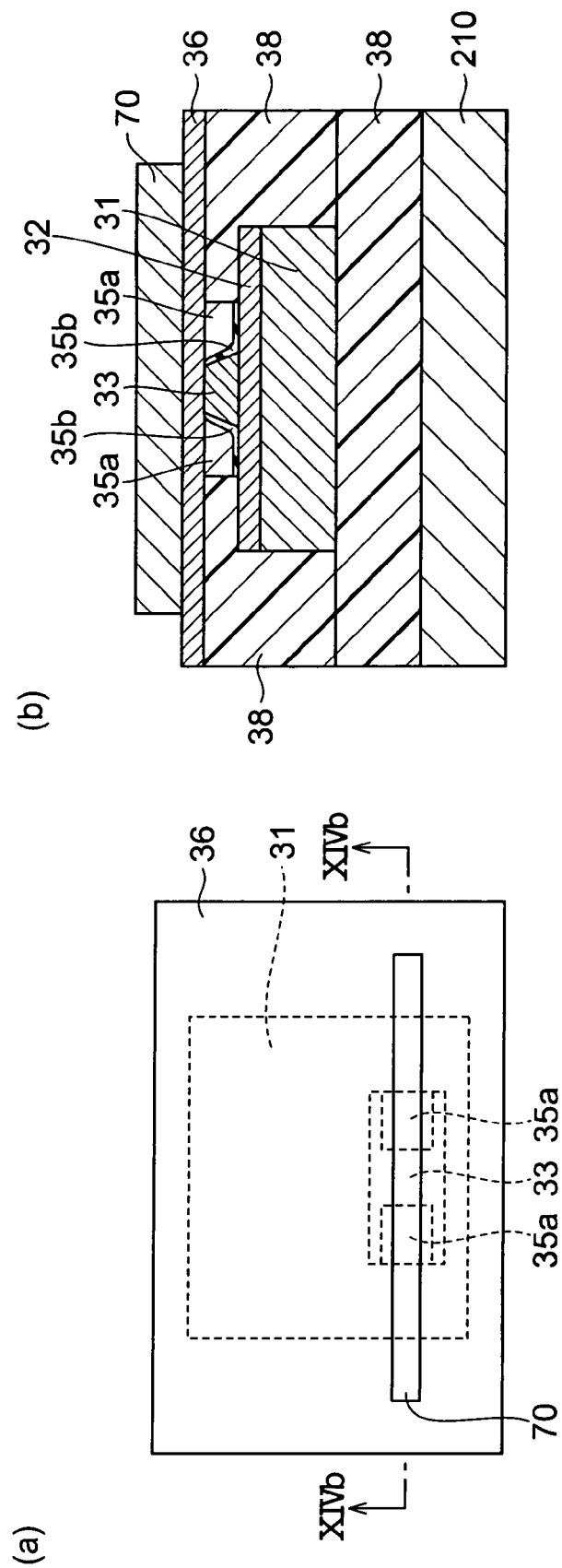
FIG. 14 is a process drawing for explaining a part of the method of making the magnetic head 21 in accordance with the first embodiment.

Subsequently, as shown in FIG. 14, a resist pattern 70 extending in the track width direction is formed so as to cover a part of the MR element 33 and upper metal gap layer 36.

Figure 15:
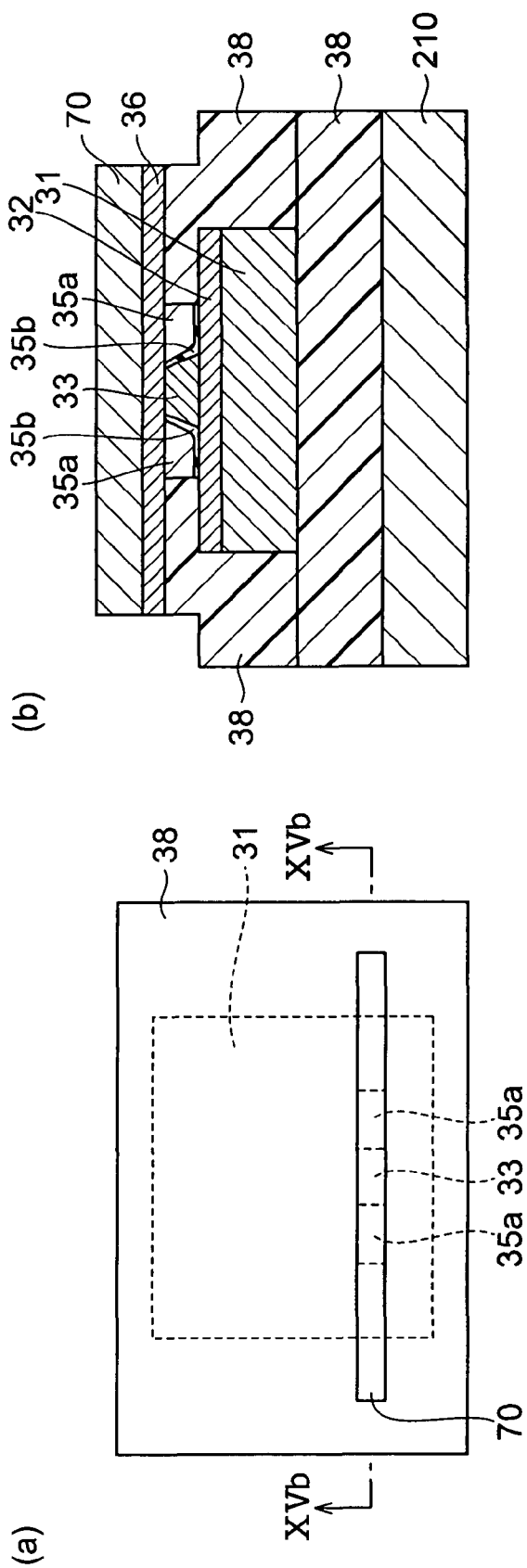
FIG. 15 is a process drawing for explaining a part of the method of making the magnetic head 21 in accordance with the first embodiment.

Next, as shown in FIG. 15, the upper metal gap layer 36, MR element 33, and magnetic domain control layers 35 are etched until they are removed from unmasked areas while using the above-mentioned resist pattern 70 as a mask.

Figure 16:
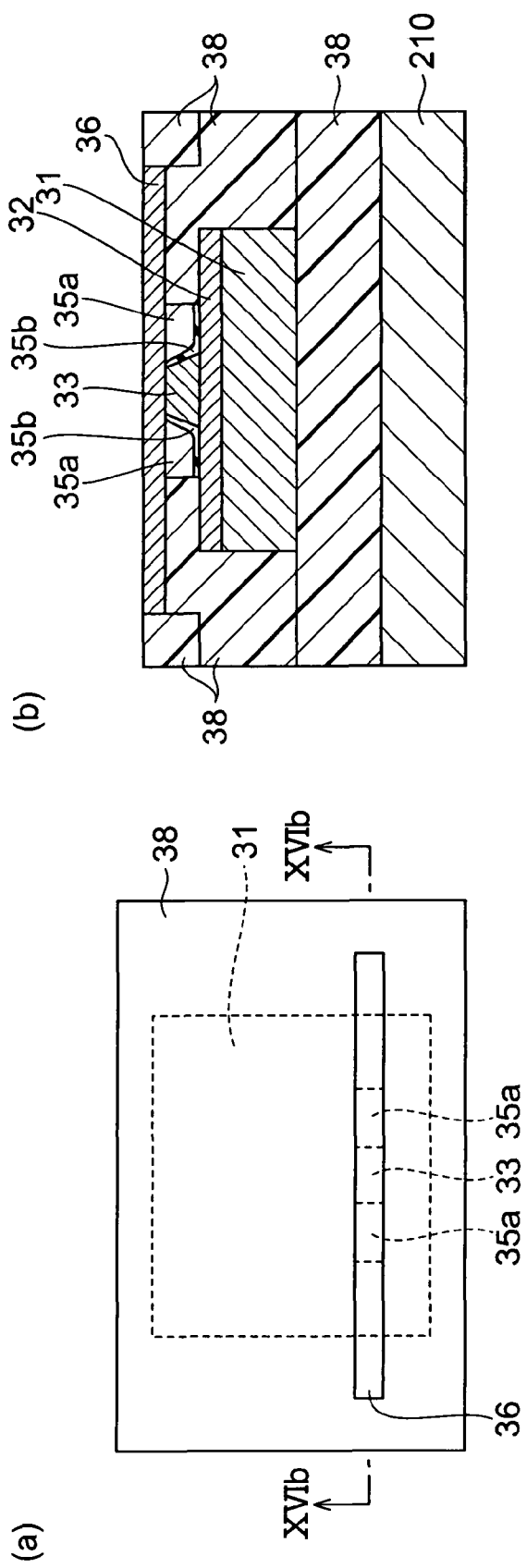
FIG. 16 is a process drawing for explaining a part of the method of making the magnetic head 21 in accordance with the first embodiment.

Subsequently, as shown in FIG. 16, an insulating layer 38 is deposited by the same thickness as the thickness by which the upper metal gap layer 36, MR element 33, and magnetic domain control layers 35 are etched, and the photoresist is dissolved with a solvent, so as to perform liftoff. This forms the upper metal gap layer 36 having a form extending in the track width direction, whose distance from the medium-opposing surface, height in the direction perpendicular to the medium-opposing surface, and position seen from the medium-opposing surface side completely coincide with those of the MR element 33.

Figure 17:
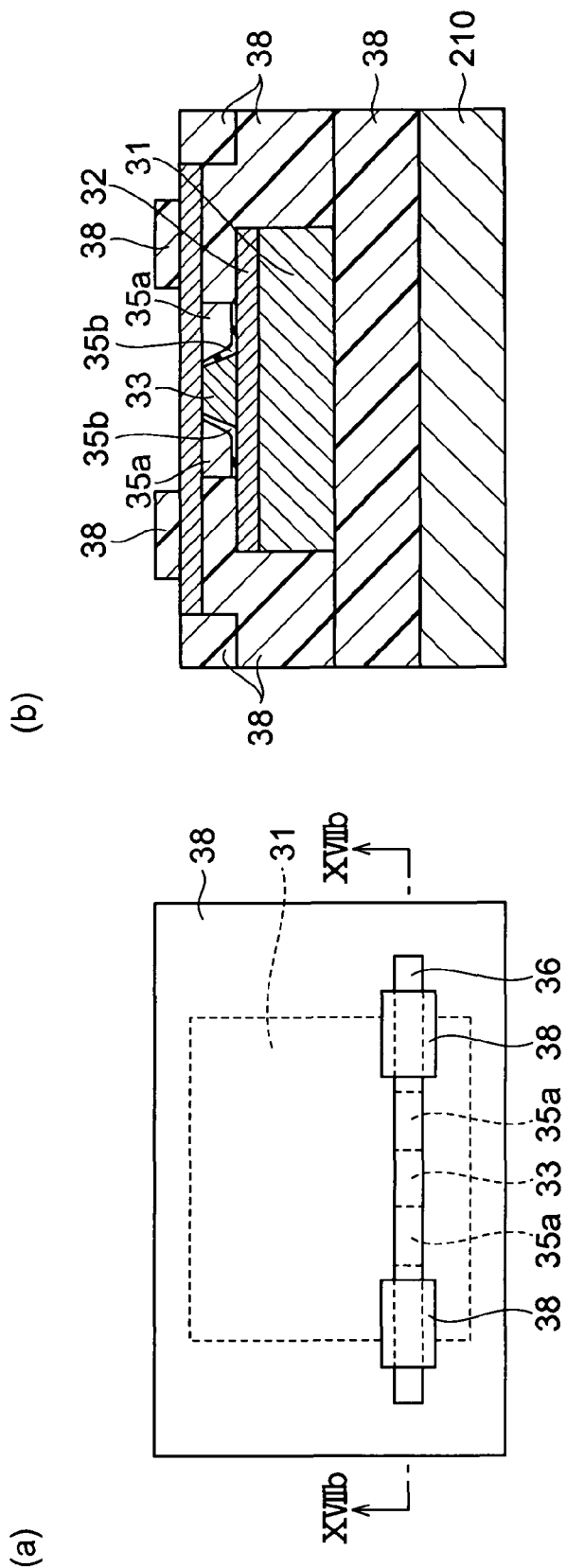
FIG. 17 is a process drawing for explaining a part of the method of making the magnetic head 21 in accordance with the first embodiment.

Next, as shown in FIG. 17, a photoresist as a mask is applied onto the substrate, so as to form two insulating layers 38 which are separated from each other in the track width direction on the upper metal gap layer 36. Here, the two insulating layers 38 are made such as to have the same length in the track width direction.

Figure 18:
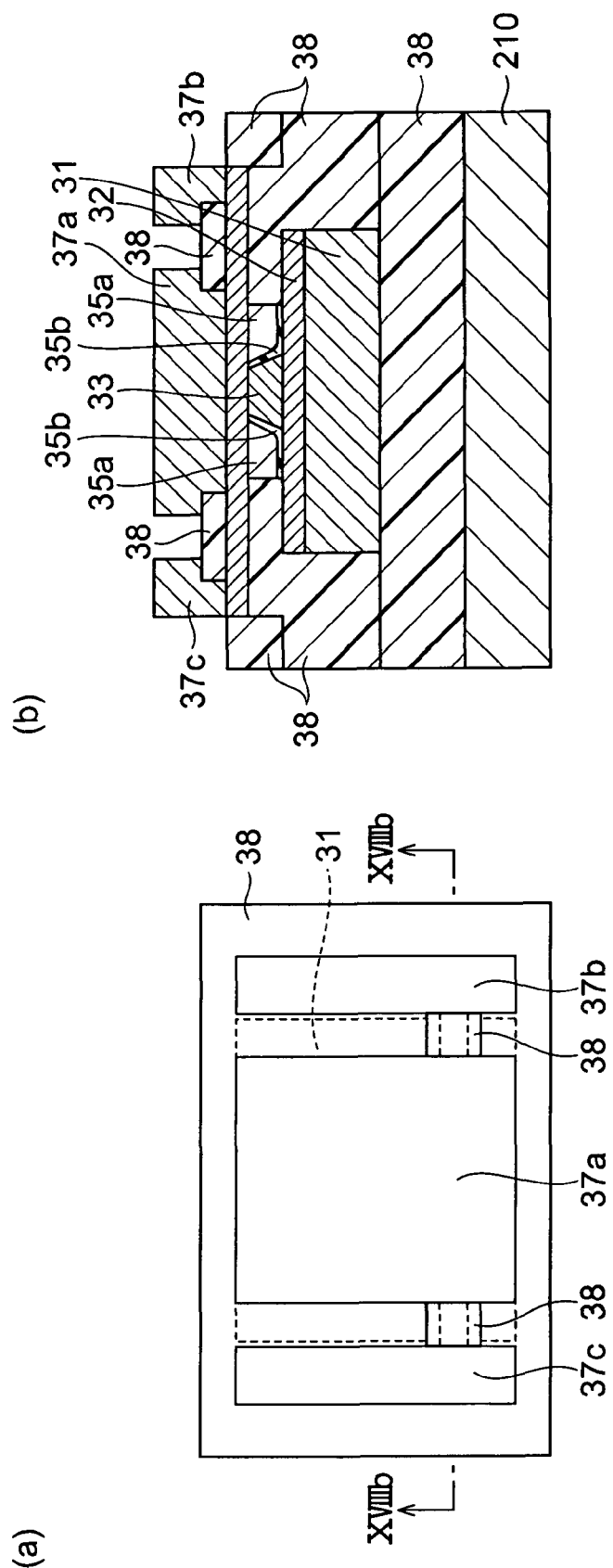
FIG. 18 is a process drawing for explaining a part of the method of making the magnetic head 21 in accordance with the first embodiment.

Subsequently, as shown in FIG. 18, an upper shield layer 37a is formed at the center part, and a pair of electrode layers 37b, 37c are formed on both sides thereof in the track width direction. As a consequence, the upper shield layer 37a and the electrode layers 37b, 37c come into contact with the upper metal gap layer 36.

The upper shield layer 37a, electrode layers 37b, 37c, and upper metal gap layer 36 also act as the electric lapping guide 39 (see FIG. 7) at the time of lapping the medium-opposing surface S as will be explained later. Here, the upper shield layer 37a and the electrode layers 37b, 37c become electrode layers of the electric lapping guide 39, while the upper metal gap layer (conductor layer) 36 becomes a conductor layer which acts as a sensor of the electric lapping guide 39.

The foregoing steps can form a part of the magnetic head 21 equipped with the electric lapping guide 39. Thereafter, an insulating layer is deposited and then is chemically mechanically polished, so as to flatten the surface. Subsequently, an electromagnetic coil element 34 such as the one shown in FIG. 4 is formed by a known method. Thereafter, an insulating layer 38 made of alumina or the like is formed, and recording pads 18a, 18b, reproducing pads 19a, 19b, and electric lapping guide pads 371a, 371b, 371c for connection such as those shown in FIG. 3 are formed. The reproducing pads 19a, 19b are electrically connected to the upper shield layer 37a and lower shield layer 31, which are the upper and lower electrodes of the MR element 33, respectively. Applying a voltage between the reproducing pads 19a, 19b can cause a sense current to flow through the MR element 33. The recording pads 18a, 18b are electrically connected to both ends of the electromagnetic coil element 34, respectively. Applying a voltage between the recording pads 18a, 18b can energize the electromagnetic coil element 34, thereby generating a writing magnetic field. The electric lapping guide pads 371a, 371b, 371c are electrically connected to the upper shield layer 37a and electrode layers 37b, 37c, respectively.

The foregoing steps are carried out on a number of areas on a wafer 2 to become the slider substrates 210 at the same time, whereby a number of magnetic heads 21 are formed into a matrix on the wafer 2 as shown in FIG. 19(a).

Next, the wafer 2 is cut by a dicing saw, for example, into bars 3 as shown in FIG. 19(b). Electric lapping guides 30 for rough polishing which are different from the above-mentioned electric lapping guides 39 are also formed on the wafer 2 at positions adjacent to the magnetic heads 21 in the track width direction.

Figure 20:
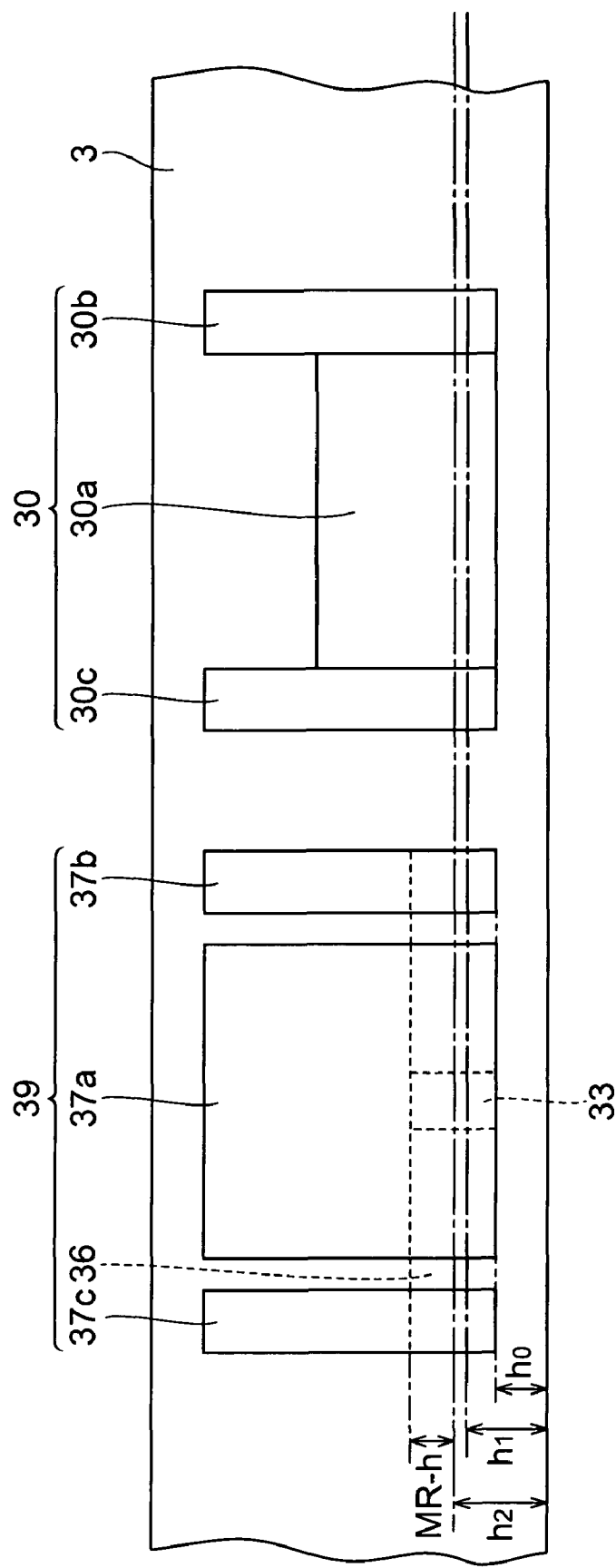
FIG. 20 is an enlarged schematic plan view of a part of the bar 3.

With reference to FIG. 20, the electric lapping guides 30 for rough polishing will be explained in detail. FIG. 20 is an enlarged plan view of the bar 3 shown in FIG. 19(b) and schematically shows electric lapping guide 39 and MR element 33 for the part of magnetic head 21. The electric lapping guides 30 for rough polishing are formed alternately with the magnetic heads 21 in the extending direction (track width direction) of the bar 3 in the state of the bar 3. Each electric lapping guide 30 for rough polishing is constituted by a conductor layer 30a and electrode layers 30b, 30c. The conductor layer 30a and electrode layers 30b, 30c are formed from a conductive metal material, so that the conductor layer 30a is electrically connected to the electrode layers 30b, 30c. The electric lapping guides 30 for rough polishing are formed simultaneously during the above-mentioned process of making the magnetic heads 21, while the distance $h_0$ from the medium-opposing surface. S of the bar 3 to the electrode layer 30b is substantially equal to the distance from the medium-opposing surface S of the bar 3 to the MR element 33.

Figure 21:
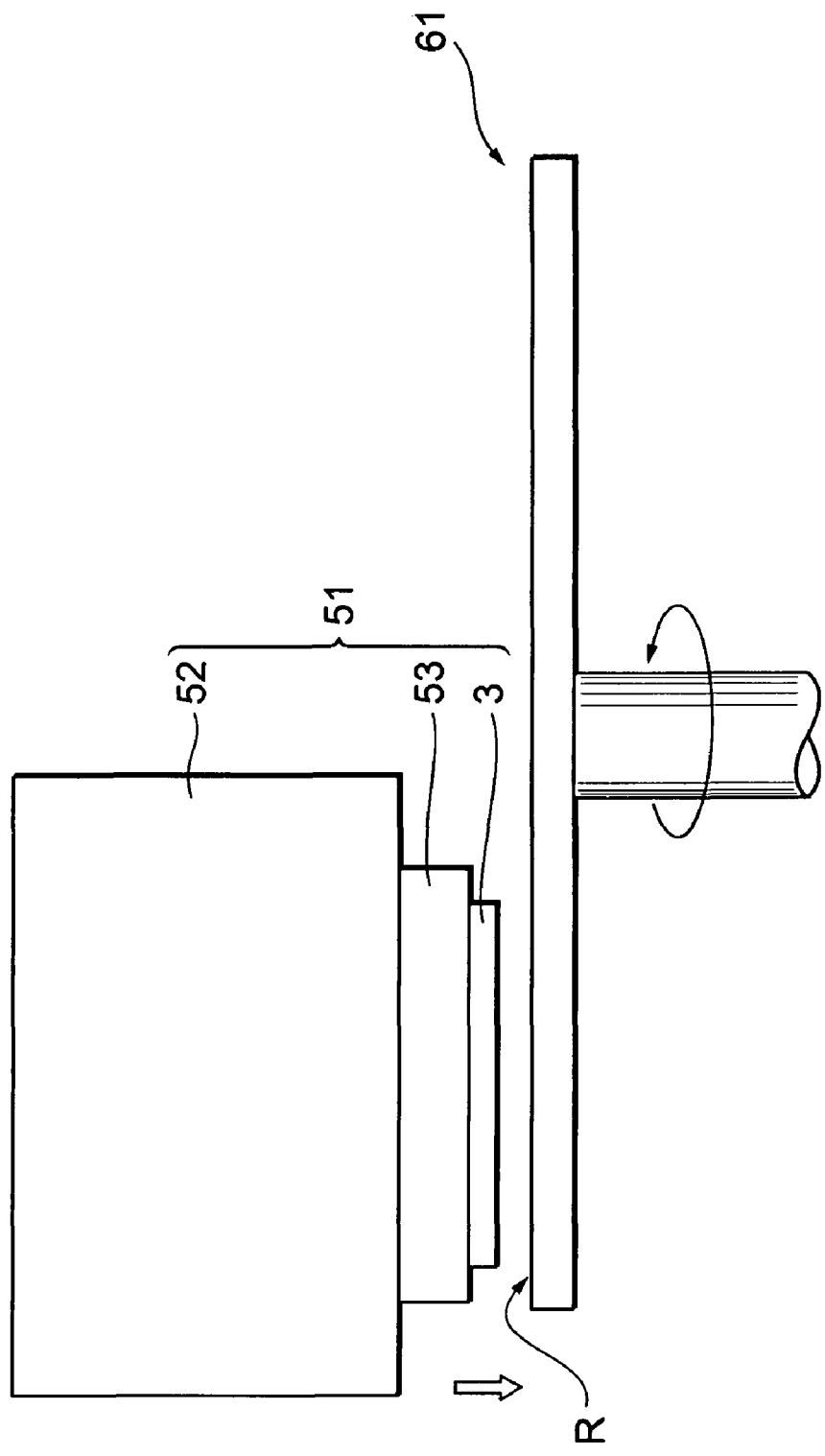
FIG. 21 is a schematic view showing a state where the bar 3 is attached to a lapping apparatus 51 used in the step of lapping the bar 3.

Subsequently, the medium-opposing surface S of the bar 3 is lapped, so as to adjust the MR height (MR-h) of the MR element 33. FIG. 21 is a schematic view showing the state where the bar 3 is attached to a lapping apparatus 51 used for lapping. The lapping apparatus 51 comprises a body 52, a holder 53 for holding the bar 3, and a polisher 61 for polishing the bar 3.

When lapping the bar 3, the bar 3 is initially attached to the holder 53 of the lapping apparatus 51. Subsequently, the body 52 is moved down, so as to bring the medium-opposing surface S of the bar 3 into contact with a rotary polishing surface R in the polisher 61. Then, while measuring the electric resistance value of the conductor layer 30a in the electric lapping guide 30 for rough polishing through the electrode layers 30b, 30c, the medium-opposing surface S of the bar 3 is lapped. As the lapping progresses, the conductor layer 30a of the electric lapping guide 30 for rough polishing is also polished, whereby the resistance value of the conductor layer 30a rises. Therefore, the amount of polishing can be measured from the resistance value at that time. The electric lapping guide 30 for rough polishing is a sensor for performing rough lapping, and is used for measuring the amount of polishing up to $h_1$ in FIG. 20.

Next, using the electric lapping guide 39, the medium-opposing surface S of the bar 3 is lapped precisely. Specifically, the medium-opposing surface S of the bar 3 is lapped while measuring the resistance value of the conductor layer (upper metal gap layer) 36 (see FIG. 7) of the electric lapping guide 39 through the electrode pads 371b, 371c (see FIG. 3). As in the lapping with the electric lapping guide 30 for rough polishing, the conductor layer 36 of the electric lapping guide 39 is polished in this case, whereby the resistance value of the conductor layer 36 rises. Therefore, the amount of polishing can be measured from the resistance value at that time. In the lapping, the medium-opposing surface S of the bar 3 is polished up to $h_2$ in FIG. 20, thereby determining the MR height (MR-h) of the MR element 33.

Thereafter, the bar 3 is cut into individual magnetic heads 21 by a dicing saw, for example, whereby the magnetic heads 21 are completed.

In the magnetic head 21 equipped with the above-mentioned electric lapping guide 39, the MR height can be controlled precisely because of the following reasons.

Since the electric lapping guide 30 for rough polishing is located at a position distanced from the MR element 33, a certain degree of deviation occurs between the distance from the medium-opposing surface S to the electric lapping guide 30 and the distance from the medium-opposing surface S to the MR element 33. Therefore, the size of MR height will be hard to control precisely if lapping is performed with the electric lapping guide 30 for rough polishing alone.

By contrast, the conductor layer 36 of the electric lapping guide 39 for precise lapping is in contact with the upper shield layer 37a (see FIG. 7), whereby the MR element 33 and the conductor 36 can be positioned very close to each other. When the MR element 33 and the conductor layer 36 are very close to each other, their forms can be easily defined by the same resist pattern as well. This allows the relative positional relationship between the conductor layer 36 and MR element 33 to be defined precisely. Therefore, the amount of polishing the MR element 33 can be grasped accurately when the amount of polishing the conductor layer 36 is measured in the step of lapping the medium-opposing surface S. While the conductor layer 36 changes its electric resistance value when polished, this electric resistance value can be measured by using the upper shield layer 37a and electrode layers 37a, 37b in contact with the conductor layer 36 as electrodes. Therefore, using the upper shield layer 37a, electrode layers 37a, 37b, and conductor layer 36 as the electric lapping guide 39 in the step of lapping the medium-opposing surface S and terminating the lapping when the electric resistance value of the conductor layer 36 reaches a predetermined value can yield a magnetic head whose size of MR height is precisely controlled to a predetermined value. Here, the upper magnetic shield layer 37a also functions as an electrode for the electric lapping guide 39, thereby simplifying the structure of the magnetic head 21.

Also, in this embodiment, the height h36 of the conductor layer 36 in the direction perpendicular to the medium-opposing surface is equal to the height MR-h (see FIG. 8) of the MR element 33 at its end face on the upper magnetic shield layer 37a side in the direction perpendicular to the medium-opposing surface S. This simplifies the structure of the magnetic head 21.

The magnetic head part 40 has a pair of electrode layers 37b, 37c, which are separated from each other in the track width direction while holding the upper shield layer 37a therebetween and are each provided with a conductor layer 36. Since a pair of electrode layers 37b, 37c are provided with the conductor layer 36, the size of MR height can be controlled more precisely by lapping the medium-opposing surface S while measuring the electric resistance values of the pair of electrode layers 37b, 37c at the same time.

The shortest distance S37b between the area of the upper shield layer 37a in contact with the conductor layer 36 and the area of one electrode layer 37b in contact with the conductor layer 36 is equal to the shortest distance S37c between the area of the upper shield layer 37a in contact with the conductor layer 36 and the area of the other electrode layer 37c in contact with the conductor layer 36 (see FIG. 7). Consequently, the medium-opposing surface S of the bar 3 can easily be lapped flatly if the lapping is performed such that the electric resistance value between the upper shield layer 37a and the electrode layer 37b is made equal to the electric resistance value between the upper shield layer 37a and the electrode layer 37c, whereby the MR height can be controlled more precisely.

The conductor layer 36 is a single layer which is in contact with a pair of electrode layers 37b, 37c. Consequently, the conductor layer 36 also acts as the upper metal gap layer 36 (see FIG. 7) located between the upper shield layer 37a and MR element 33, thereby simplifying the structure of the magnetic head 21.

In this embodiment, the MR element 33 is a tunneling magnetoresistive element which is a current-perpendicular-to-plane type element in which a sense current flows in a direction perpendicular to its surface of lamination. Consequently, the size of MR height can be controlled precisely in a magnetic head having a current-perpendicular-to-plane type magnetism detecting element, such as a tunneling magnetoresistive element in particular, which is hard to lap while measuring the electric resistance value of the MR element 33 itself.

The HGA in accordance with this embodiment comprises the above-mentioned magnetic head and a suspension for supporting the magnetic head, whereas the hard disk drive in accordance with this embodiment comprises the above-mentioned HGA and a magnetic recording medium opposing the medium-opposing surface S. This can yield a hard disk drive, whose magnetic head has a precisely controlled MR height, which is adaptable to high-density magnetic recording.

In the method of making a magnetic head in accordance with this embodiment, a resist pattern extending in the track width direction can simultaneously define the respective heights of the conductor layer 36 (i.e., the conductor layer acting as a sensor of the electric lapping guide 39) and the MR element 33 in the direction perpendicular to the medium-opposing surface S. Since the conductor layer 36 is in contact with the upper shield layer 37a covering the MR element 33, the conductor layer 36 and MR element 33 are located close to each other (see FIG. 7). This makes it possible to precisely define the relative positional relationship between the conductor layer 36 and MR element 33. Therefore, the amount of polishing the MR element 33 can be grasped accurately if the amount of polishing the conductor layer 36 is measured in the step of lapping the medium-opposing surface S. While the conductor layer 36 changes its electric resistance value when polished, this electric resistance value can be measured by using the upper shield layer 37a and electrode layers 37b, 37c in contact with the conductor layer 36 as electrodes. Therefore, using the conductor layer 36 as a sensor (electric lapping guide) in the step of lapping the medium-opposing surface S and terminating the lapping when the electric resistance value of the conductor layer 36 reaches a predetermined value can yield a magnetic head whose size of MR height is controlled precisely. Here, the upper magnetic shield layer 37a also functions as an electrode for the electric lapping guide 39, thereby facilitating the making of the magnetic head.

In this embodiment, the resist pattern 70 extending in the track width direction has the same height in the direction perpendicular to the medium-opposing surface S on the magnetism detecting element 33 and on the conductor layer 36 (see FIG. 14). Consequently, the height h36 of the conductor layer 36 in the direction perpendicular to the medium-opposing surface S equals the height MR-h (see FIG. 8) of the MR element 33 at its end face on the upper shield layer 37a side in the direction perpendicular to the medium-opposing surface S, thereby simplifying the structure of the magnetic head 21.

Second Embodiment

A second embodiment of the magnetic head, head gimbal assembly, and hard disk drive in accordance with the present invention will now be explained.

Figure 22:
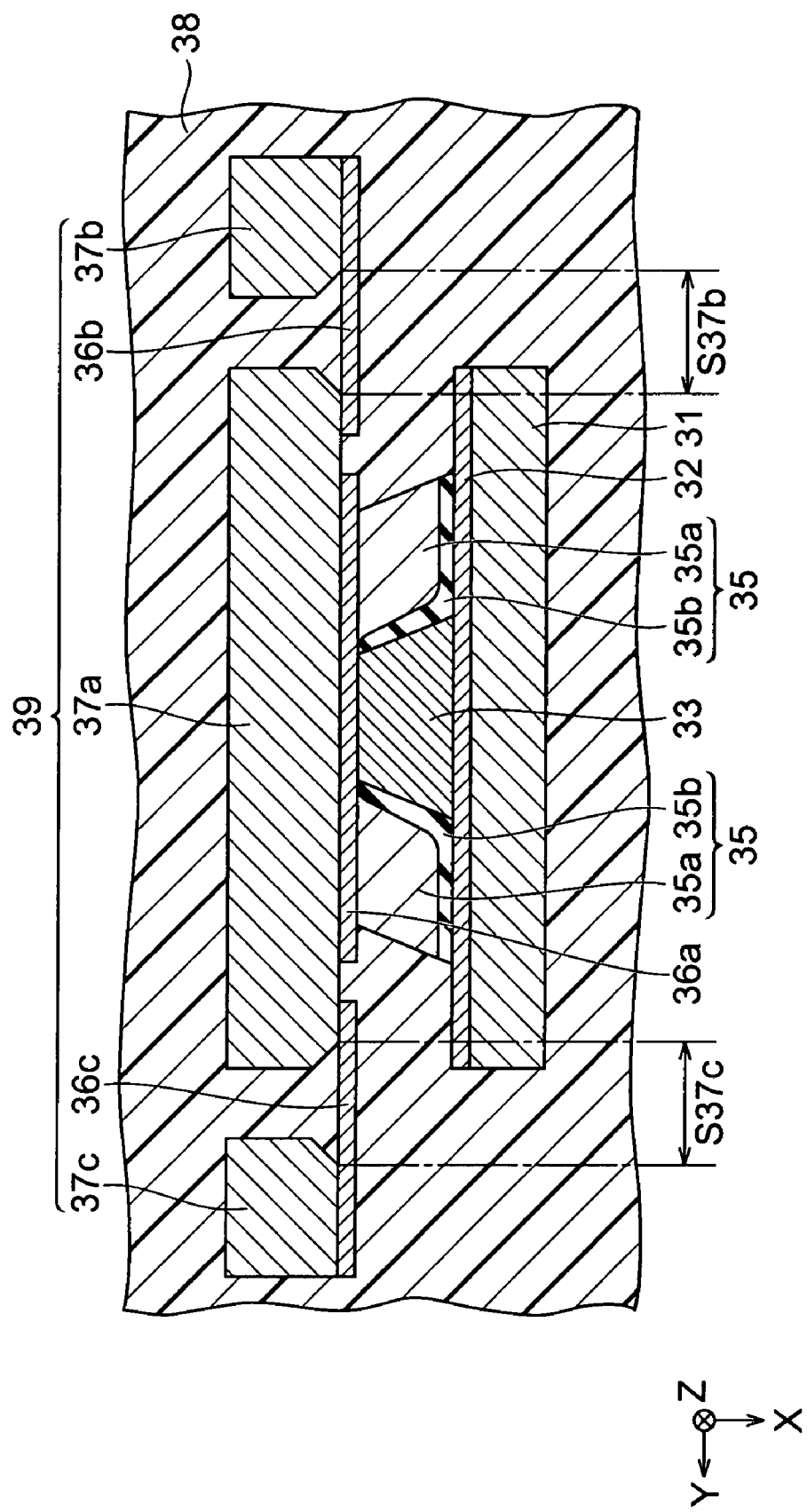
FIG. 22 is a sectional view of the magnetic head 21 in accordance with a second embodiment.

The magnetic head and the like in accordance with the second embodiment differ from those of the first embodiment only in the structure of electric lapping guide 39 in the magnetic head 21. FIG. 22 is a sectional view showing an MR element 33 and its surroundings in the magnetic head in accordance with the second embodiment, and corresponds to FIG. 7 in the magnetic head in accordance with the first embodiment.

As shown in FIG. 22, the upper metal gap layer 36a in the magnetic head 21 in accordance with the second embodiment is a layer different from conductor layers 36b, 36c while being in contact with the upper shield layer 37a. In this embodiment, the conductor layers 36b, 36c are separated from each other. The upper shield layer 37a is electrically connected to the electrode layers 37b, 37c through the conductor layers 36b, 36c, respectively. In this embodiment, the electric lapping guide 39 is constituted by the upper shield layer 37a, the pair of electrode layers 37b, 37c, and the conductor layers 36b, 36c.

Such a structure can also yield effects similar to those in the first embodiment. In the second embodiment, the upper metal gap layer 36a can be constructed by a material different from that of the conductor layers 36b, 36c. For example, the upper metal gap layer 36a can be constituted by a material such as Au or Cu, for example, from the viewpoint that it will be more preferred if the resistance value of the area where the sense current flows in the MR element is lower. The conductor layers 36b, 36c may be constructed by a magnetic material since they are not in contact with the bias magnetic field layer 35a, or by a material such as Ta or W, for example, from the viewpoint that it will be more preferred if the amount of change in resistivity is greater at the time of lapping.

The upper metal gap layer 36a is separated from the conductor layers 36b, 36c in this embodiment but may be in contact with them.

Figure 23:
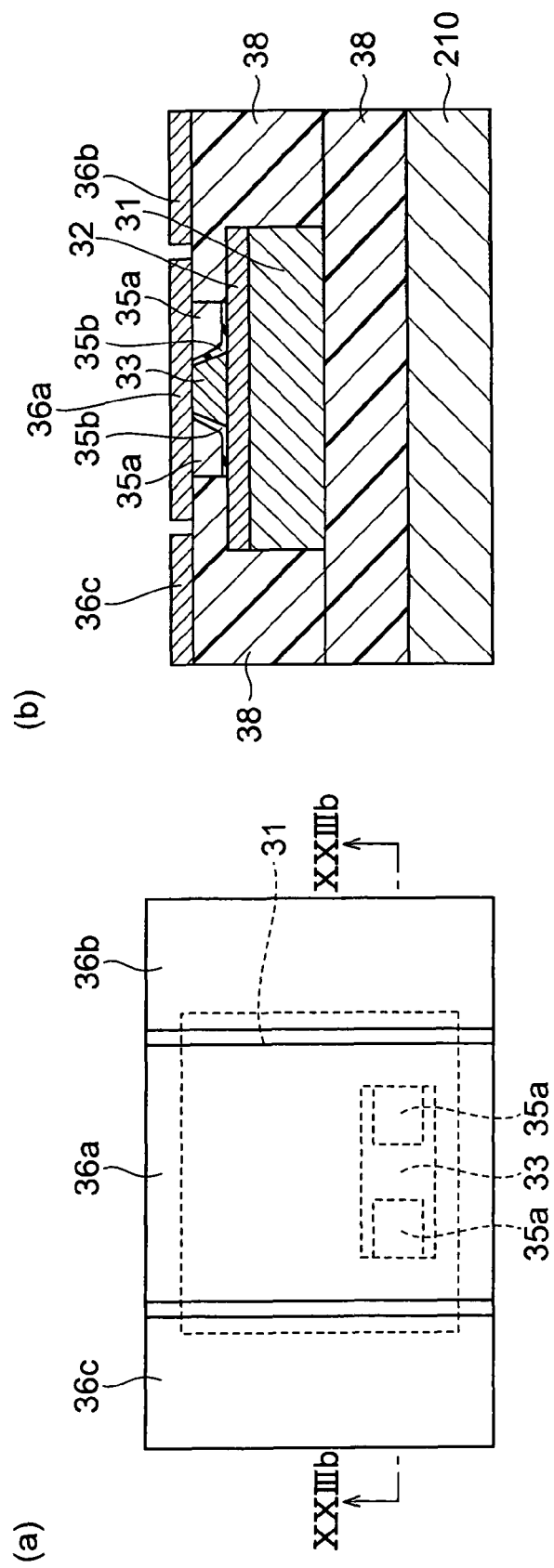
FIG. 23 is a process drawing for explaining a part of the method of making the magnetic head 21 in accordance with the second embodiment.
Figure 24:
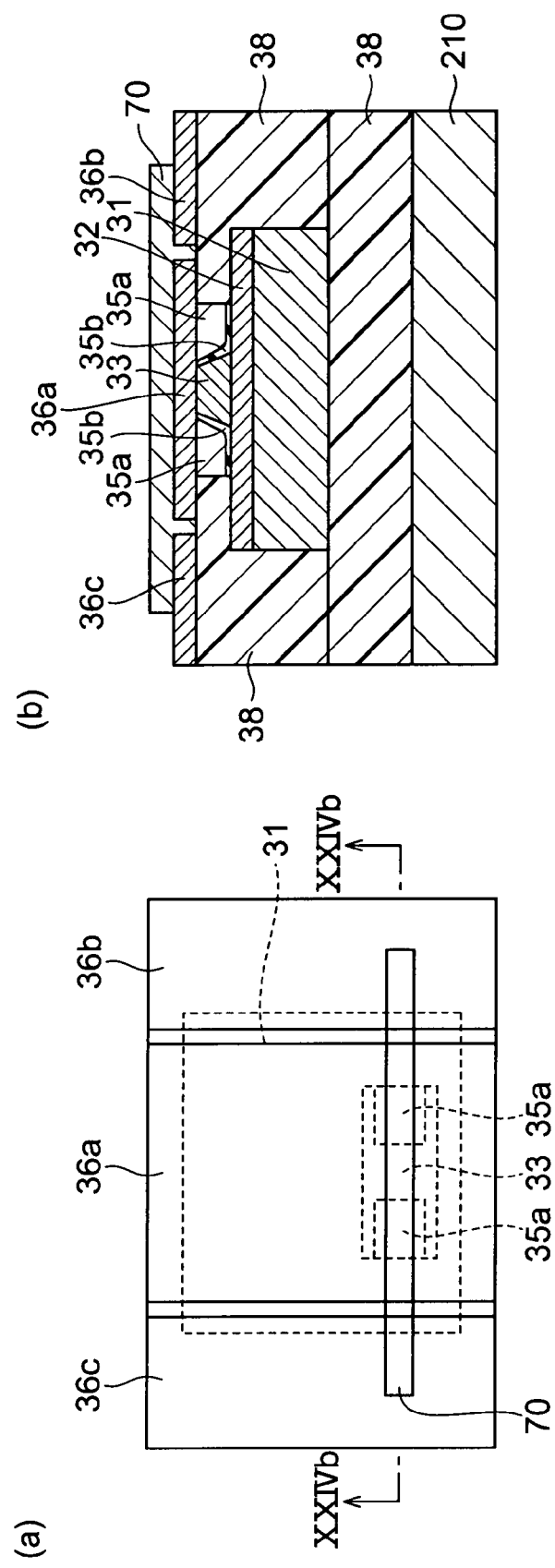
FIG. 24 is a process drawing for explaining a part of the method of making the magnetic head 21 in accordance with the second embodiment.

The method of making the magnetic head 21 in accordance with the second embodiment will now be explained with respect to FIGS. 23 and 24. In FIGS. 23 and 24, (a) is a plan view of a magnetic head intermediate, whereas (b) is a sectional view of the plan view of (a).

The method of making the magnetic head in accordance with the second embodiment is the same as that of the first embodiment up to the forming of the MR element 33 and magnetic domain control layer 35 in FIG. 10 and differs therefrom in the method of forming the conductor layer 36 (see FIG. 13) thereafter.

As shown in FIG. 23, on the substrate formed with the MR element 33 and magnetic domain control layer 35, an upper metal gap layer 36a is formed at the center part, whereas a pair of conductor layers 36b, 36c are formed so as to be separated from respective side faces of the upper metal gap layer 36a in the track width direction.

Next, as shown in FIG. 24, a resist pattern 70 extending in the track width direction is formed so as to cover a part of the MR element 33 and upper metal gap layer 36. Thereafter, the same steps as those of the first embodiment are performed, whereby the magnetic head in accordance with the second embodiment can be obtained.

The present invention is not limited to the above-mentioned embodiments.

For example, current-in-plane (CIP) type elements can also be used as the MR element 33. In this case, an insulating gap layer formed from alumina or the like is provided instead of the upper metal gap layer 36a and lower metal gap layer 32 in the second embodiment. Further, the MR element 33 is provided with a metal layer for causing a sense current to flow parallel to its surface of lamination.

Though the magnetic head part 40 has the electromagnetic coil element 34 as a magnetic recording element in the above-mentioned embodiments, a structure without the electromagnetic coil element 34 is also possible.

Though the height h36 (see FIG. 8) of the conductor layer 36 in the direction perpendicular to the medium-opposing surface is the same as the height MR-h of the MR element 33 at its end face on the upper shield layer 37a side and is constant in any part in the track width direction of the conductor layer 36 in the above-mentioned embodiments, it may be inconstant as well. For example, the height h36 may be smaller than the height MR-h of the MR element 33 between electrode layers 37b, 37c.

Though both sides of the upper shield layer 37a in the track width direction are provided with a pair of electrodes 37b, 37c, a structure including only one electrode layer is also possible.

The shortest distance S37b (see FIG. 7) between the area of the upper shield layer 37a in contact with the conductor layer 36 and the area of one electrode layer 37b in contact with the conductor layer 36 may differ from the shortest distance S37c between the area of the upper shield layer 37a in contact with the conductor layer 36 and the area of the other electrode layer 37c in contact with the conductor layer 36.

The conductor layer 36 may extend beyond the electrode layers 37b, 37c in the track width direction.

What is claimed is:

1. A magnetic head comprising a slider substrate and a magnetic head part provided on the slider substrate;
   wherein the magnetic head part comprises, seeing from a medium-opposing surface side:
   a magnetism detecting element;
   an upper magnetic shield layer arranged on the magnetism detecting element;
   an electrode layer separated in a track width direction from the upper magnetic shield layer and separated in the track width direction from the magnetism detecting element; and
   a conductor layer, arranged closer to the slider substrate than are the upper magnetic shield layer and electrode layer, extending in the track width direction so as to be in contact with the upper magnetic shield layer and electrode layer and forming a part of the medium-opposing surface.

2. A magnetic head according to claim 1, wherein the height of the conductor layer in a direction perpendicular to the medium-opposing surface is equal to the height of the magnetism detecting element at an end face thereof on the upper magnetic shield layer side in the direction perpendicular to the medium-opposing surface.

3. A magnetic head according to claim 2, wherein the magnetic head part has a pair of electrode layers, the pair of electrode layers being separated from each other in the track width direction while holding the upper magnetic shield layer therebetween, the electrode layers being arranged with respective conductor layers.

4. A magnetic head according to claim 3, wherein the shortest distance between an area of the upper magnetic shield layer in contact with the conductor layer and an area of one electrode layer in contact with the conductor layer is equal to the shortest distance between the area of the upper magnetic shield layer in contact with the conductor layer and an area of the other electrode layer in contact with the conductor layer.

5. A magnetic head according to claim 3, wherein the pair of conductor layers construct one layer in contact with the first and second electrode layers.

6. A magnetic head according to claim 3, further comprising a gap layer having a composition different from that of the pair of conductor layers, the gap layer being arranged between the pair of conductor layers in the track width direction, and being arranged between the magnetism detecting element and the upper magnetic shield layer in a direction perpendicular to the track width direction.

7. A magnetic head according to claim 1, further comprising:
   a lower magnetic shield layer disposed between the magnetism detecting element and the slider substrate,
   wherein the magnetism detecting element is a current-perpendicular-to-plane type element allowing a sense current to flow in a direction perpendicular to a surface of lamination thereof, and
   a sense current flows from the upper magnetic shield layer to the lower magnetic shield layer through the magnetism detecting element.

8. A magnetic head according to claim 7, wherein the magnetism detecting element is a tunneling magnetoresistive element.

9. A head gimbal assembly comprising:
   the magnetic head according to claim 1; and
   a suspension for supporting the magnetic head.

10. A hard disk drive comprising:
    the head gimbal assembly according to claim 9; and
    a magnetic recording medium opposing the medium-opposing surface.

* * * * *